United States Patent
Zeng et al.

(10) Patent No.: US 8,625,725 B2
(45) Date of Patent: Jan. 7, 2014

(54) LIN RECEIVER PROVIDING IMMUNITY AGAINST ISO PULSES

(75) Inventors: Ni Zeng, Shenzhen (CN); Dasong Lin, Shenzhen (CN)

(73) Assignee: STMicroelectronics (Shenzhen) R&D Co. Ltd., Shenzhen (CN)

( * ) Notice: Subject to any disclaimer, the term of this patent is extended or adjusted under 35 U.S.C. 154(b) by 0 days.

(21) Appl. No.: 13/423,585

(22) Filed: Mar. 19, 2012

(65) Prior Publication Data

US 2013/0003805 A1     Jan. 3, 2013

(30) Foreign Application Priority Data

Jun. 30, 2011    (CN) .......................... 2011 1 0189869

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/00 | (2006.01) |
| H04L 25/08 | (2006.01) |

(52) U.S. Cl.
USPC .......................................... 375/346; 375/316

(58) Field of Classification Search
USPC ........................................................ 375/346
See application file for complete search history.

(56) References Cited

U.S. PATENT DOCUMENTS

| | | | |
|---|---|---|---|
| 2009/0222603 A1* | 9/2009 | Den Besten ................... | 710/106 |
| 2009/0262567 A1 | 10/2009 | Shin et al. | |
| 2012/0169376 A1* | 7/2012 | Himpe ............................ | 327/34 |

OTHER PUBLICATIONS

Office Action mailed Aug. 22, 2013 for U.S. Appl. No. 13/483,796 (5 pages).

* cited by examiner

*Primary Examiner* — Erin File
(74) *Attorney, Agent, or Firm* — Gardere Wynne Sewell LLP

(57) ABSTRACT

A LIN receiver circuit includes filtering circuitry receiving an input signal and producing a filtered signal, a first comparator comparing the filtered signal to a threshold voltage, and a driver block producing the receiver output signal. The receiver circuit further includes an input comparator, signal-adjusting circuitry, and deglitching circuitry. The input comparator detects a low voltage on the input signal, and the signal-adjusting circuitry drives the filtered signal to a particular value to shorten the length of a glitch at the output of the first comparator. Meanwhile, the deglitching circuitry detects and removes the glitch to produce a deglitcher output signal. The deglitcher output signal is received by the driver block, which outputs the receiver output signal, wherein the receiver output signal contains no glitches, and is delayed by no more than 7.5 µs, thus providing immunity to ISO pulses.

26 Claims, 21 Drawing Sheets

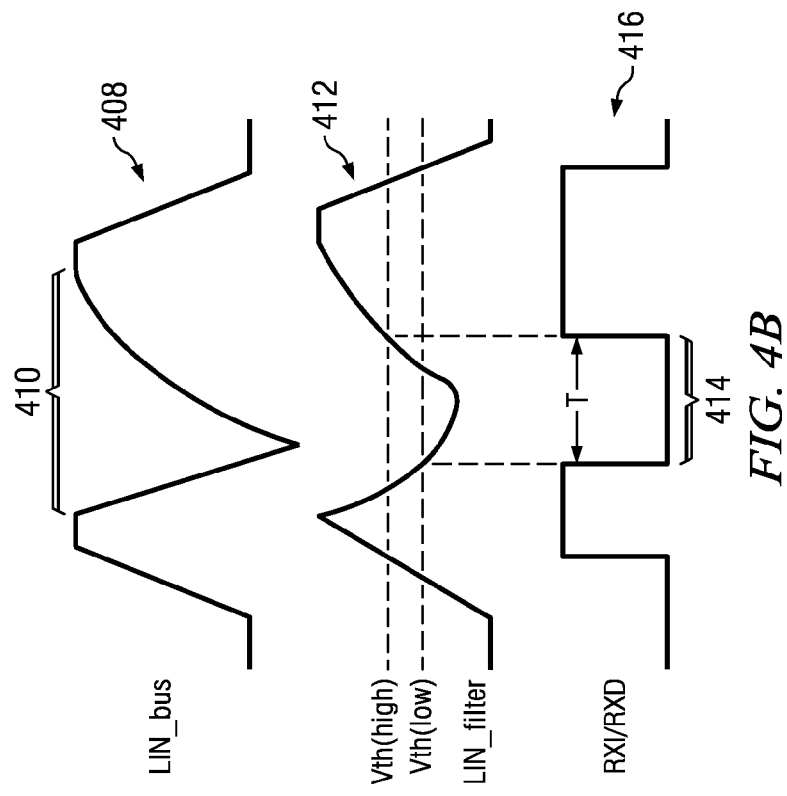
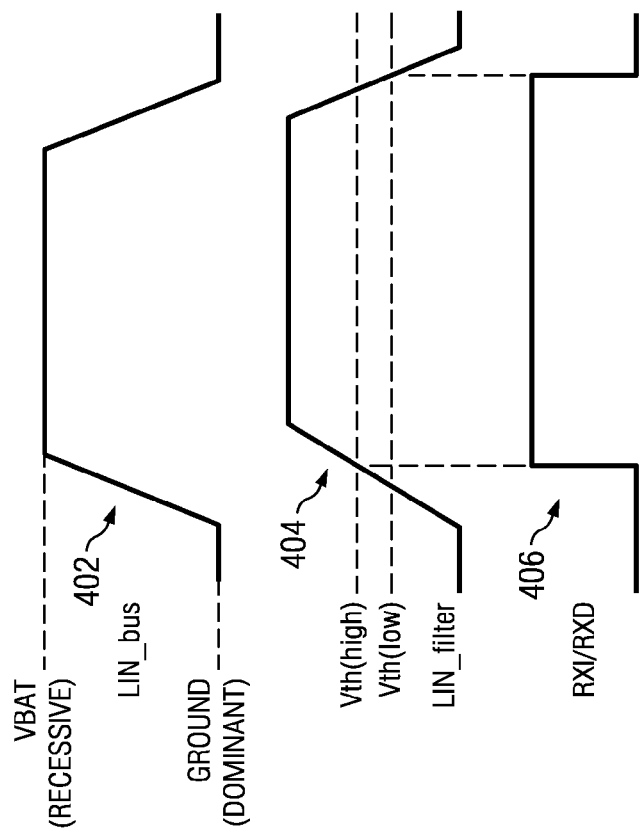
FIG. 4A
FIG. 4B

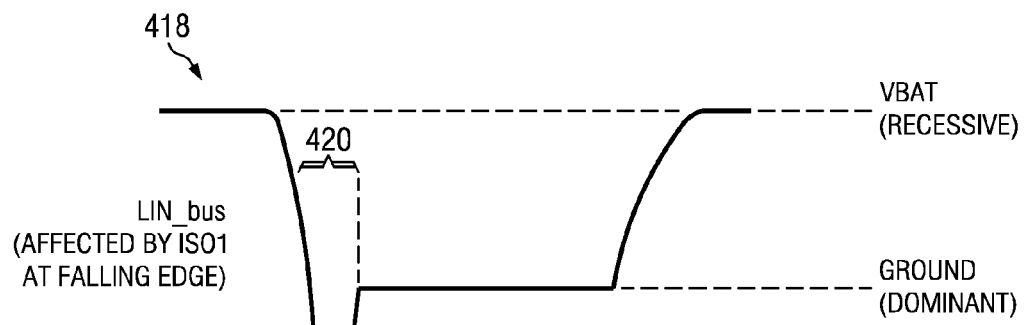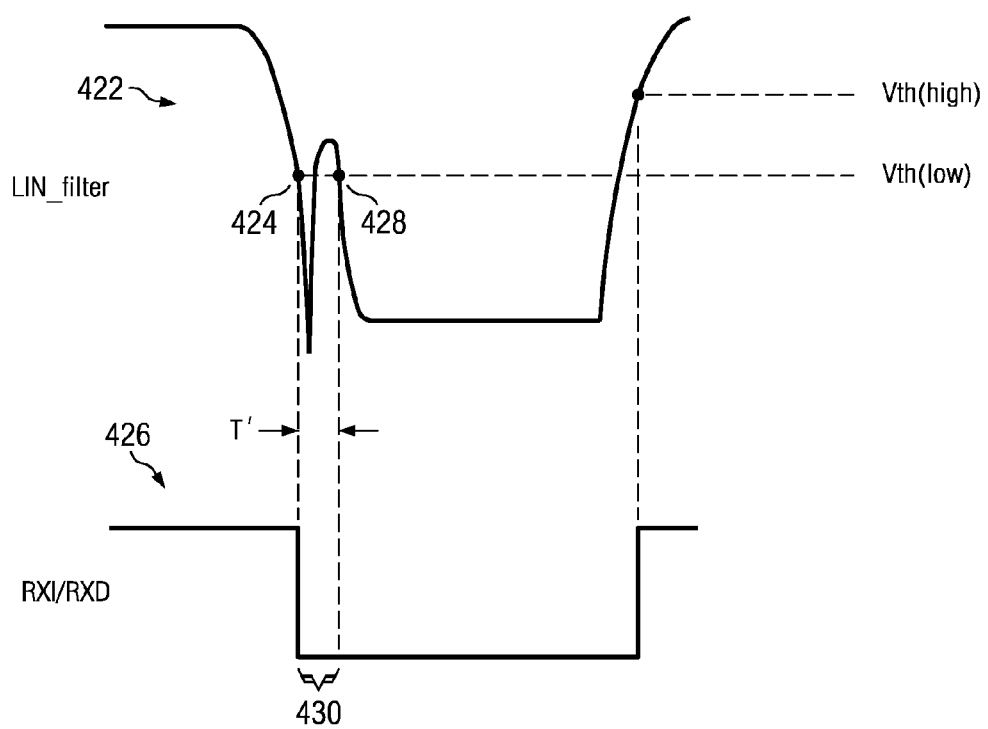
FIG. 4C

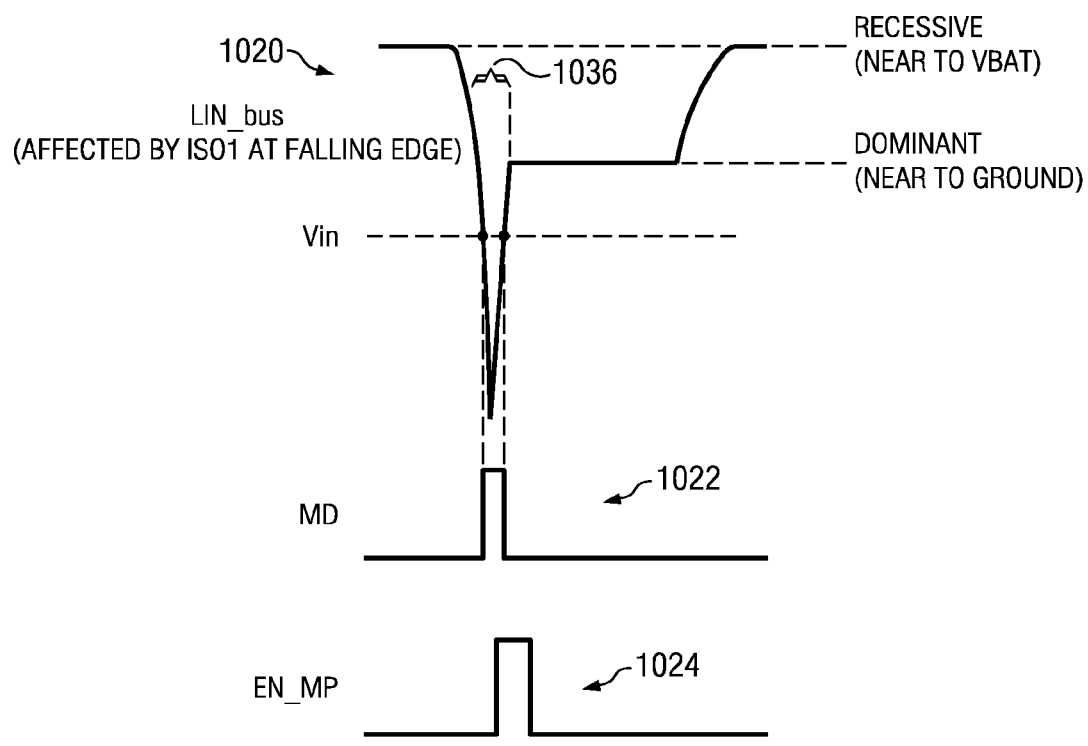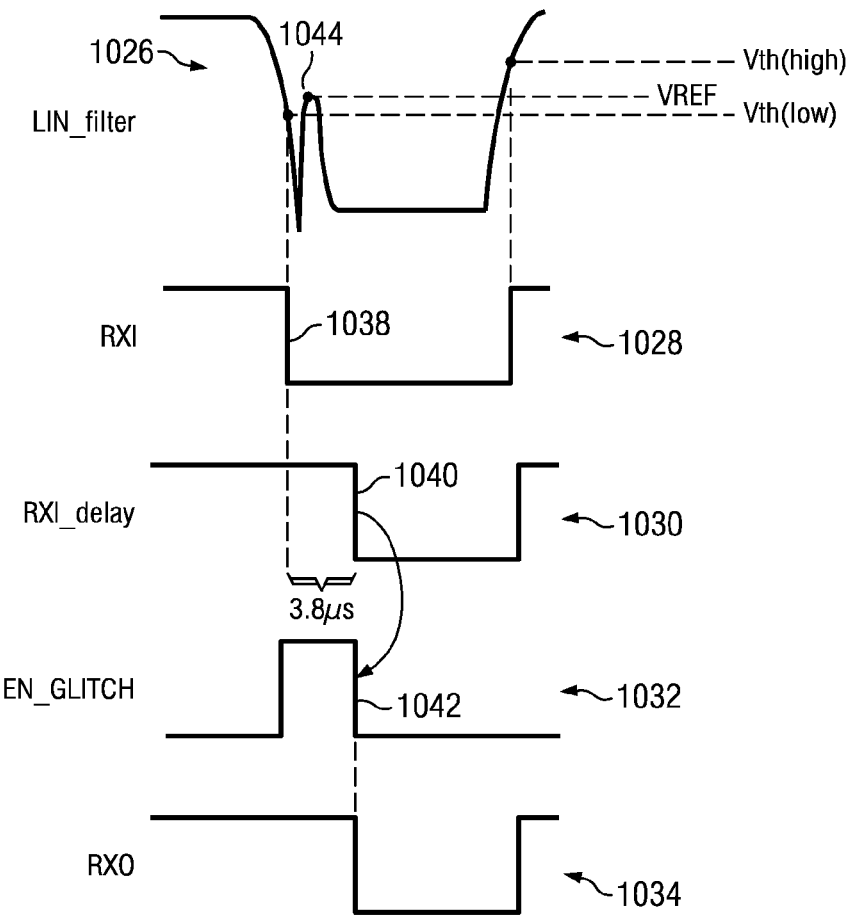
FIG. 10C

LIN RECEIVER PROVIDING IMMUNITY AGAINST ISO PULSES

PRIORITY CLAIM

This application claims priority from Chinese Application for Patent No. 201110189869.1 filed Jun. 30, 2011, the disclosure of which is hereby incorporated by reference.

BACKGROUND

1. Technical Field

The present invention relates generally to Local Interconnect Network (LIN) circuitry and, more specifically, to LIN receiver providing immunity against Interrupt Source Output (ISO) pulses.

2. Introduction

Local Interconnect Networks (LIN) typically implement a transmitter and a receiver for communicating within the network. Receiver circuitry is susceptible to interference on the input signal which results in incorrect receiver output. Specifically, receivers are susceptible to radio frequency (RF) pulses and ISO pulses, which result in incorrect low states occurring on the receiver output signal. In an attempt to mitigate incorrect receiver output, known receiver circuits have been designed in accordance with conformance testing and proper emission criteria to provide immunity to RF pulses. However, these known receiver circuits are still susceptible to ISO pulses. As such, there exists a need for a LIN receiver circuit that produces an output signal that is immune to the effects of ISO pulses occurring on the input signal of the receiver.

SUMMARY

The present disclosure provides a LIN receiver circuit that provides immunity to ISO pulses. In one embodiment, the LIN receiver comprises comparator circuitry operable to compare a filtered input signal to a first or second hysteresis threshold value and output a hysteresis signal having a first state if said filtered signal is less than or equal to said first hysteresis threshold value and having a second state if said filtered signal is greater than or equal to said second hysteresis threshold value; circuitry operable to detect a low transient voltage of an unfiltered input signal, wherein said low transient voltage would produce an effective glitch lasting for a first length of time on said hysteresis signal; voltage-adjusting circuitry operable, in response to the detection of said low transient voltage, to adjust a voltage of said filtered signal to shorten said effective glitch to a second length of time less than said first length of time; and deglitcher circuitry operable to detect and remove said shortened effective glitch from said hysteresis signal and generate an output signal.

In another embodiment, the LIN receiver circuit comprises a comparator circuit receiving an input signal and a first reference voltage, and outputting a comparator signal indicating the presence of a low transient voltage on said input signal; voltage-adjusting circuitry receiving said comparator signal and a second reference voltage, and outputting an adjustment current when said comparator signal indicates the presence of said low transient voltage on said input signal, said adjustment current driving a filtered input signal toward said second reference voltage when said filtered input signal is less than said second reference voltage; a hysteresis circuit comparing said filtered input signal to first or second hysteresis threshold values and producing a hysteresis signal having a first state if said filtered input signal is less than or equal to said first hysteresis threshold value and having a second state if said filtered input signal is greater than or equal to said second hysteresis threshold value, wherein said hysteresis signal would have an effective glitch as a result of said low transient voltage, and wherein a length of said effective glitch on said hysteresis signal is shortened by said adjustment current driving said filtered input signal to said second reference voltage when said filtered input signal is less than said second reference voltage; and a deglitcher circuit receiving said hysteresis signal and said comparator signal, and producing an output signal by removing the shortened effective glitch.

The present disclosure also provides a method comprising filtering an input signal to produce a filtered signal; comparing said filtered signal to a first or second hysteresis value; outputting a hysteresis signal having a first state if said filtered signal is less than or equal to said first hysteresis value and having a second state if said filtered signal is greater than or equal to said second hysteresis value; detecting a low transient voltage on said input signal, wherein said low transient voltage would produce an effective glitch lasting for a first length of time on said hysteresis signal; in response to the detection of said low transient voltage, adjusting a voltage of said filtered signal to shorten said effective glitch to a second length of time less than said first length of time; detecting said shortened effective glitch on said hysteresis signal; and removing said shortened effective glitch from said hysteresis signal to produce an output signal.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures not drawn to scale, in which like reference numbers indicate similar parts, and in which:

FIGS. 4A, 4B, and 4C illustrate waveforms corresponding to an input signal received by the conventional LIN receiver circuit illustrated in FIG. 3;

FIGS. 10A, 10B, and 10C illustrate example circuit conditions to demonstrate operation of the deglitching circuitry shown in FIG. 9;

DETAILED DESCRIPTION OF THE DRAWINGS

Figure 1A:
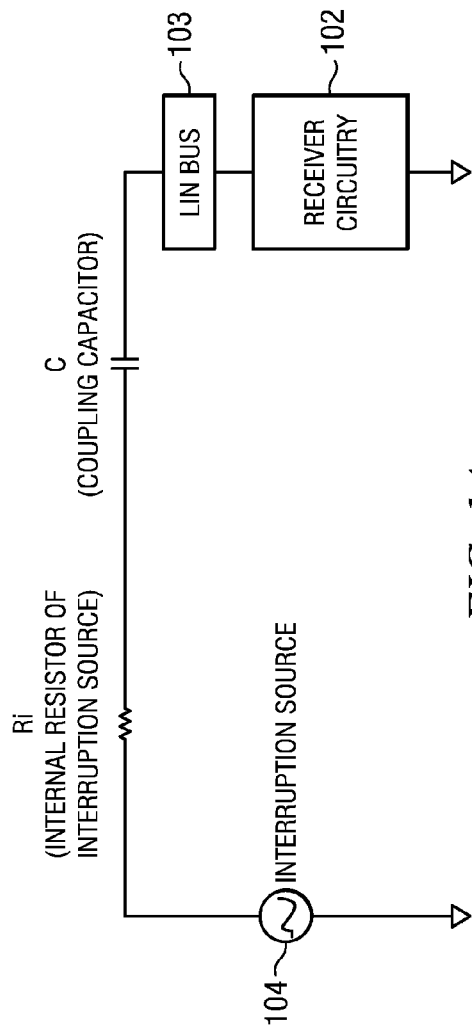
FIGS. 1A, 1B, 1C, and 1D illustrate an example configuration for testing circuitry for immunity to injected RF and ISO pulses, an example embodiment of the LIN bus, and corresponding timing parameters and voltage levels.
Figure 1D:
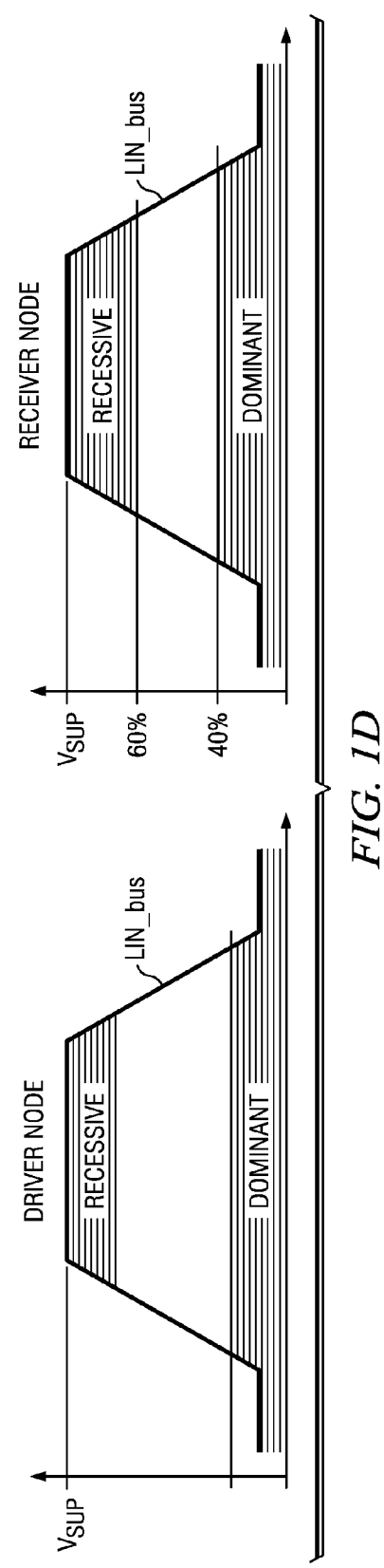

The receiver circuitry discussed herein is tested for immunity to both RF and ISO pulses under a supply voltage VBAT of 14V. An example test configuration 100 is shown in FIG. 1A. The test configuration 100 includes receiver circuitry 102 to be tested, wherein the receiver circuitry 102 is connected at a LIN bus 103 in series with a resistor Ri, capacitor C, and interruption source 104. The resistor Ri is an internal resistor of the interruption source 104, and the capacitor C is a coupling capacitor connected to the LIN bus 103. In an example embodiment, the LIN bus 103 may be a LIN as described and illustrated in accordance with LIN Specification Package Revision 2.1, released Nov. 24, 2006 by the LIN Consortium, the contents of which are hereby incorporated by reference. As such, an example of the LIN bus 103 is illustrated in greater detail in FIG. 1B, and example waveforms and signals associated with the example LIN bus 103 are illustrated in FIG. 1C.

The test configuration 100 shown in FIG. 1A is designed to introduce an interrupt pulse (either RF or ISO) at the LIN bus 103. The interruption source 104 provides the pulses to be injected into the receiver circuitry 102 (at the LIN bus 103), wherein the pulses may be either RF or ISO pulses. The RF pulses are in a range of 1 MHz to 1000 MHz, and the ISO pulses may be ISO1, ISO2a, ISO3a, and ISO3b pulses. These pulses are shown in greater detail in respective FIGS. 2A, 2B, 2C, and 2D, and are discussed briefly below. In general, the test configuration 100 operates by injecting an ISO or RF pulse into the LIN bus 103. As is explained below, the LIN bus 103 provides an input signal LIN_bus to the receiver circuitry 102, and the receiver circuitry 102 produces a receiver output signal RXD. The output signal RXD of the receiver circuitry 102 is then analyzed to determine if the receiver circuitry 102 is immune to the interrupt pulse provided by the interruption source 104 at the LIN bus 103.

Figure 1B:
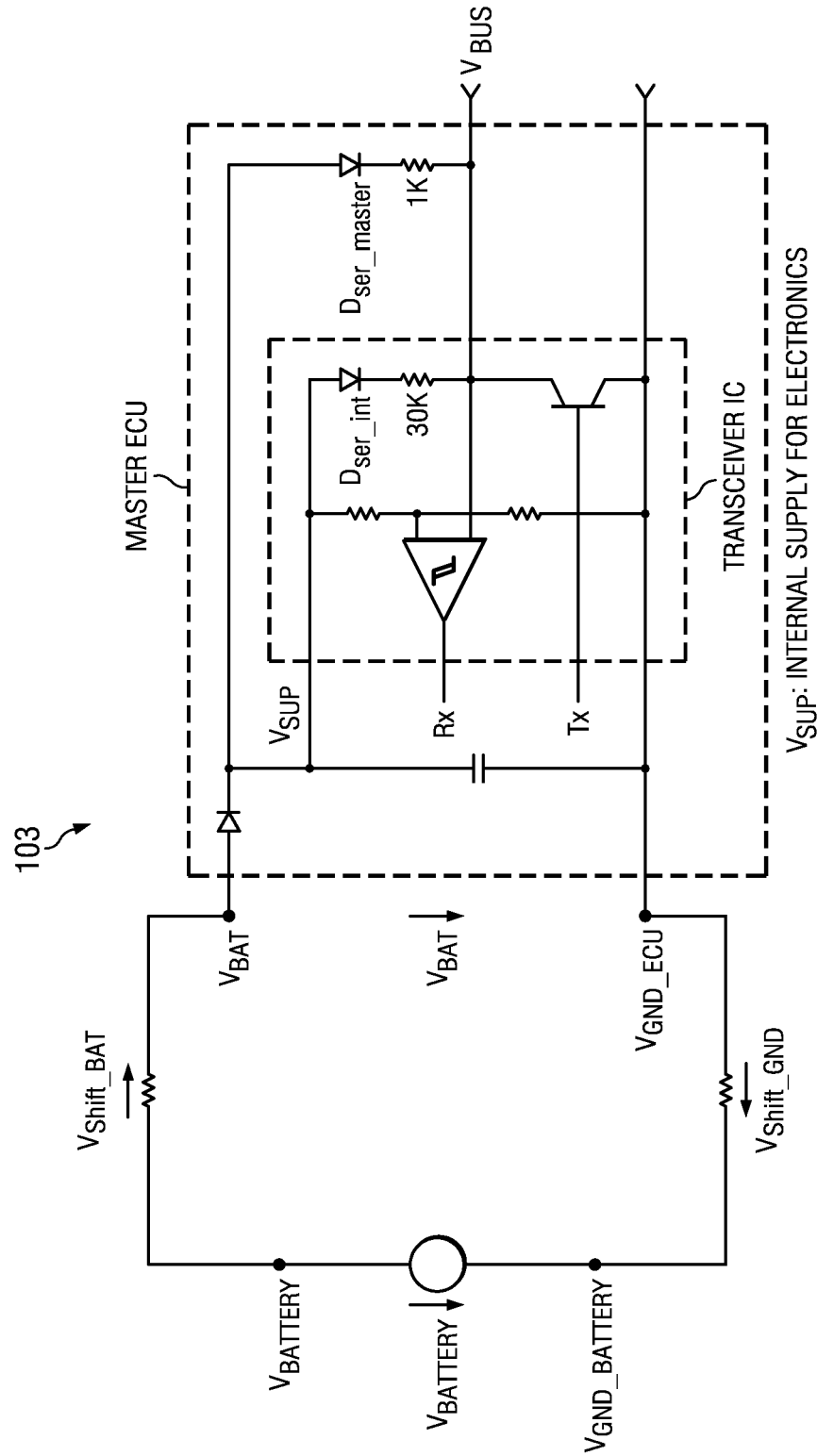
Figure 1C:
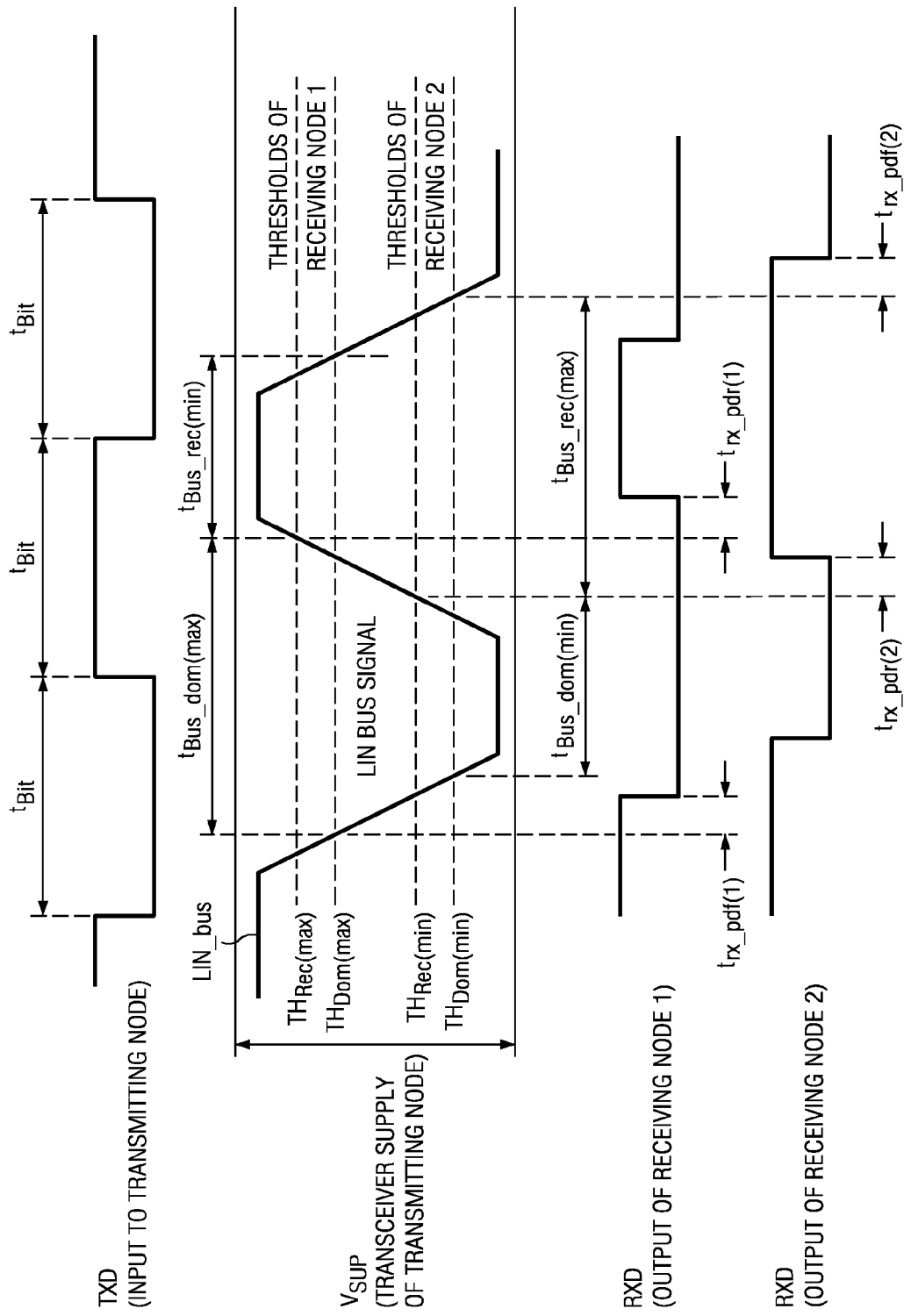

As mentioned above, an example of the LIN bus 103 is shown in FIG. 1B. The LIN bus 103 provides a connection between transmitter circuitry (not shown) and the receiver circuitry 102 in a network such as, for example, an automotive network. FIG. 1C illustrates the timing parameters of the LIN bus 103 shown in FIG. 1B, wherein TXD is the input signal received from the transmitter circuitry (again, not shown), and LIN_bus is the open-drain output of the transmitter circuitry, which also happens to be the LIN input signal provided to the receiver circuitry 102. For correct transmission and reception of a bit, it is presumed that the LIN_bus signal is available with the correct voltage level (dominant or recessive) at the bit sampling time $t_{Bit}$ of the receiver (in one embodiment, $t_{Bit}$=50 μs. The dominant and recessive states of the LIN_bus signal are illustrated in FIG. 1D, wherein $V_{SUP}$ represents the internal voltage supply for electronic components within the LIN 103. It should be understood that the internal supply $V_{SUP}$ may be different than the supply voltage VBAT. This may be the result of protection filter elements and dynamic voltage changes on the bus. Additionally, the example LIN circuit 103 is designed in accordance with the specifications provided in the LIN Specification Package Revision 2.1, previously incorporated by reference, in order to satisfy proper conformance testing.

Figure 2A:
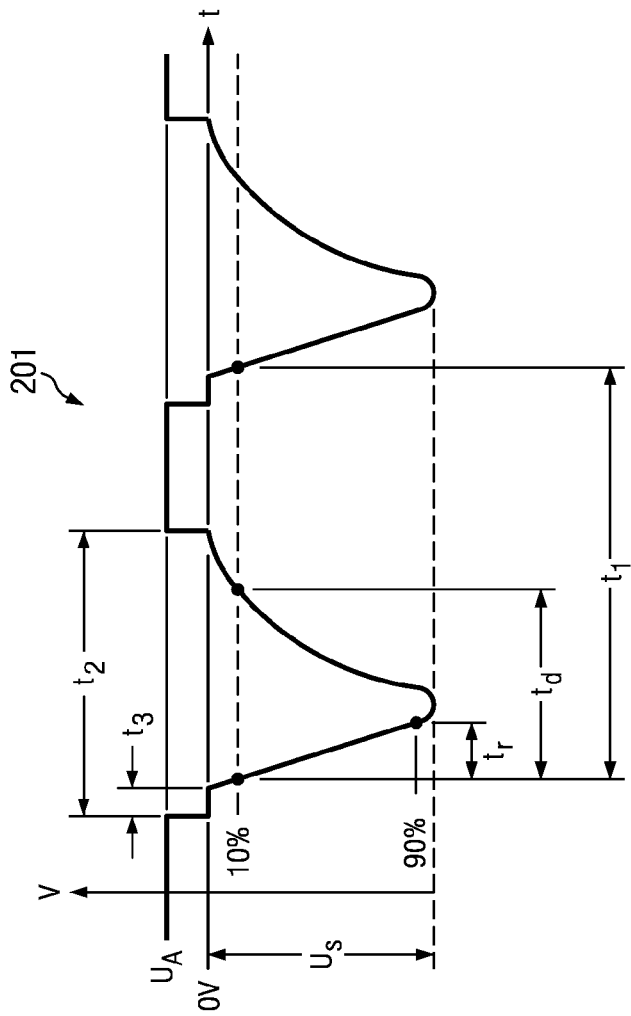
FIGS. 2A, 2B, 2C, and 2D illustrate waveforms of ISO pulses ISO1, ISO2a, ISO3a, and ISO3b, respectively.

FIG. 2A illustrates an example ISO1 pulse 201 and a chart 202 describing its parameters. As will be made apparent in the subsequent description, the ISO1 pulse 201 is a negative pulse that causes the receiver to produce an incorrect low output on RXD when the input signal LIN_bus is in a recessive state.

Figure 2B:
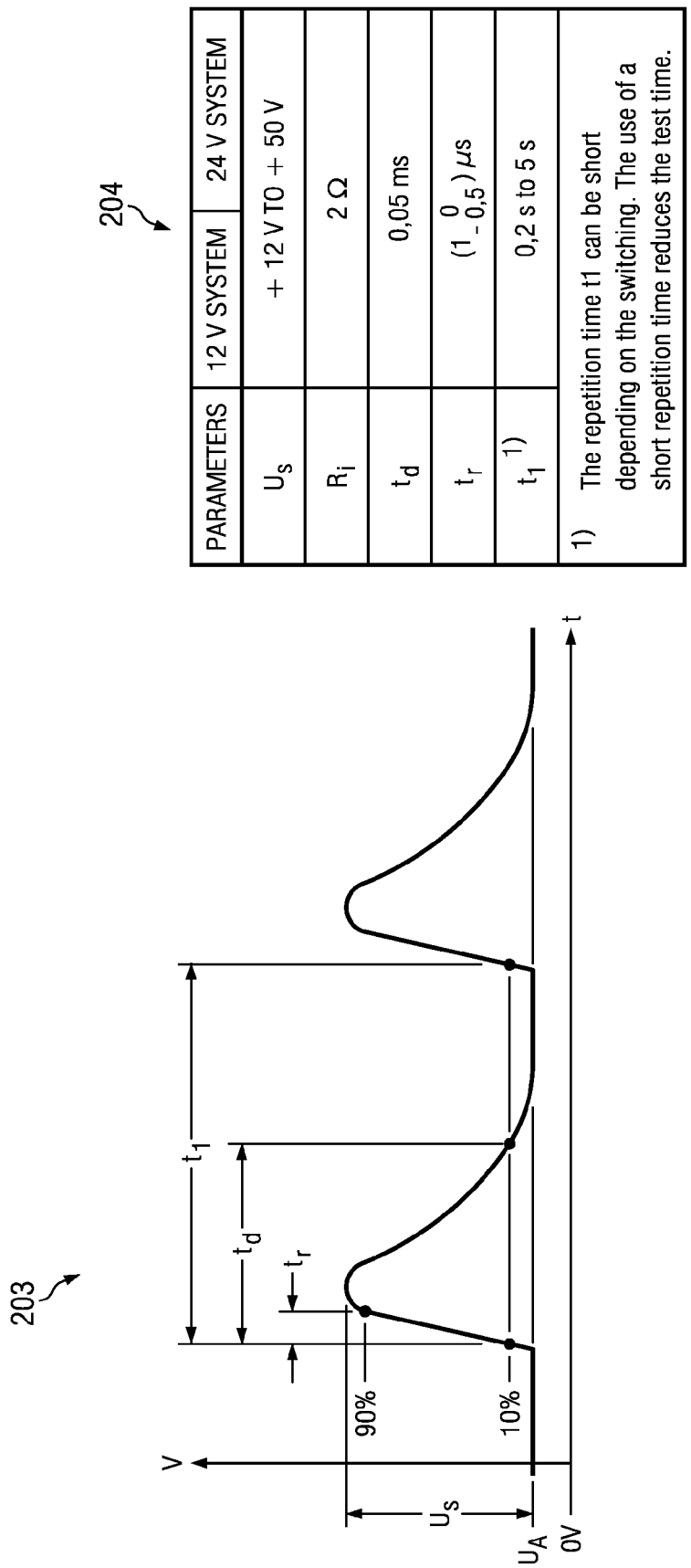

FIG. 2B illustrates an example ISO2a pulse 203 and a chart 204 describing its parameters. The ISO2a pulse 203 is a positive pulse that causes the receiver to produce a premature low output on RXD when the input signal LIN_bus is transitioning from a recessive state to a dominant state.

Figure 2C:
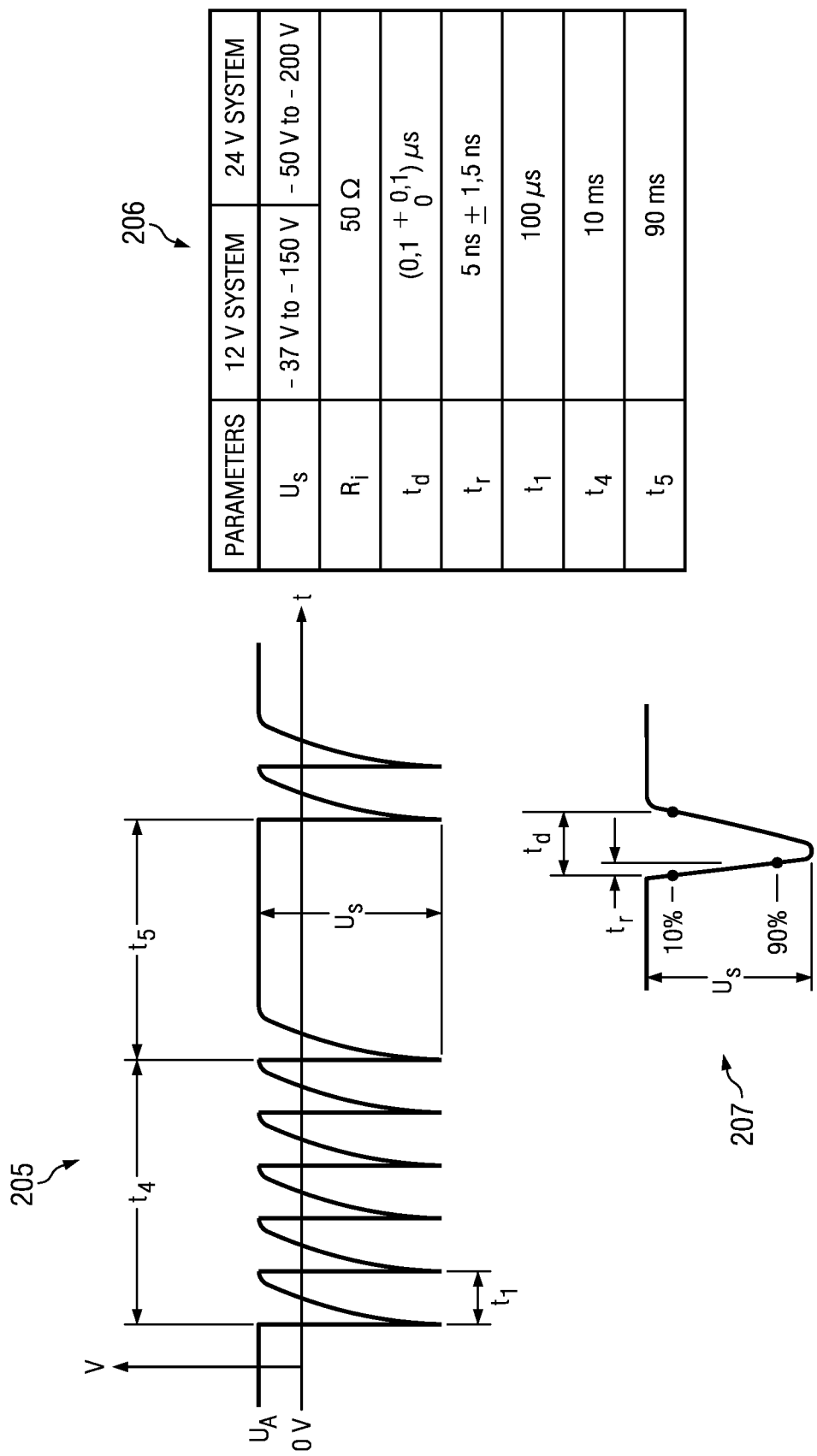

FIG. 2C illustrates an example ISO3a pulse 205 and a chart 206 describing its parameters. The ISO3a pulse 205 is a negative pulse with a falling edge that may be too quick to be detected. However, its rising edge is slower, so it affects the LIN_bus signal as a positive pulse, similar to the ISO2a pulse. As such, the ISO3a pulse 205 causes the receiver to produce a premature low output on RXD when the input signal LIN_bus is transitioning from a recessive state to a dominant state. The ISO3a pulse 205 is narrower than the ISO1 and ISO2a pulses shown in FIGS. 2A and 2B, and may sometimes be removed by internal filters. However, these internal filters may be ineffective for high amplitude ISO3a pulses. FIG. 2C also provides another waveform 207 illustrating the $t_r$, $t_d$, and $U_s$ parameters shown in the chart 206.

Figure 2D:
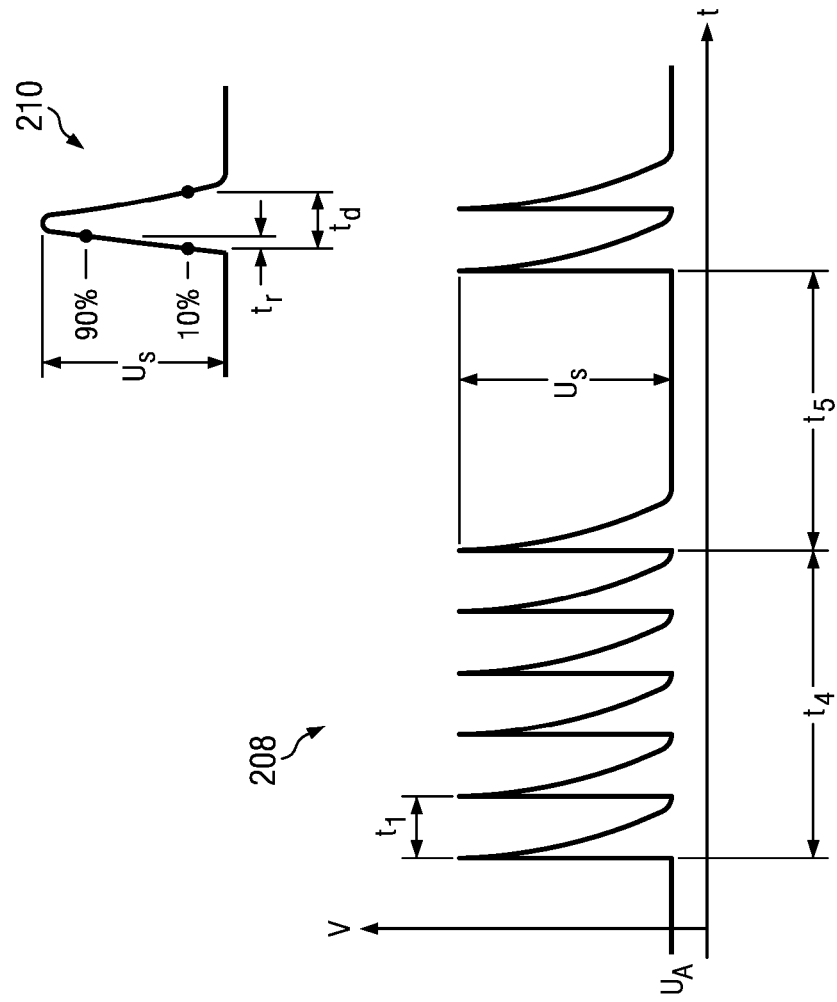

FIG. 2D illustrates an example ISO3b pulse 208 and a chart 209 describing its parameters. The ISO3b pulse 208 is a positive pulse with a rising edge that may be too quick to be detected. However, its falling edge is slower, so it affects the LIN_bus signal as a negative pulse, similar to the ISO1 pulse. As such the ISO3b pulse 208 causes the receiver to produce an incorrect low output on RXD when the input signal LIN_bus is in a recessive state. Similar to the ISO3a pulse, the ISO3b pulse 208 is narrower than the ISO1 and ISO2a pulses, and may be sometimes removed by internal filters. However, these internal filters may be ineffective for high amplitude ISO3b pulses. FIG. 2D also provides another waveform 210 illustrating the $t_r$, $t_d$, and $U_s$ parameters shown in the chart 209.

Analysis of the output signal RXD produced by the receiver circuitry 102 consists of two criteria for assessing immunity of the receiver circuitry 102 to ISO pulses: damage and function. If both the damage and function criteria are satisfied, then the receiver circuitry 102 provides sufficient immunity to ISO pulses. Damage is generally assessed in accordance with the voltage duration of devices connected to the LIN bus 103. Since ISO and RF pulses may cause drastic voltage fluctuation at the LIN bus 103, devices coupled thereto should be able to handle these fluctuations without damaging the LIN_bus signal. Although damage to other devices may be related to ISO and RF pulses occurring on the LIN bus 103 and the resulting receiver circuit output signal RXD, the damage may be assessed independently from the function criteria. Therefore, for purposes of demonstrating immunity to ISO and RF pulses, the receiver circuits disclosed herein are understood to satisfy the damage criteria, and the receiver output signals RXD of the receiver circuits disclosed herein are assessed in accordance with the function criteria.

Assessment of function is twofold. First, the time difference between the receiver output signal RXD without an injected pulse and the receiver output signal RXD with an injected pulse (also referred to herein as the interrupted RXD signal) should be less than 7.5 µs. In other words, the output signal RXD of the receiver circuitry 102 should not be delayed by more than 7.5 µs when an ISO pulse is injected. Second, the voltage level of the interrupted RXD signal should not be error triggered, meaning glitches should not be present on the output signal RXD. If both of these conditions are satisfied, then the function assessment is successful. It should be appreciated that although subsequent figures may not illustrate the test configuration shown in FIG. 1A, the test configuration may be applied to the various embodiments of receiver circuitry in order to provide appropriate immunity testing.

Figure 3:
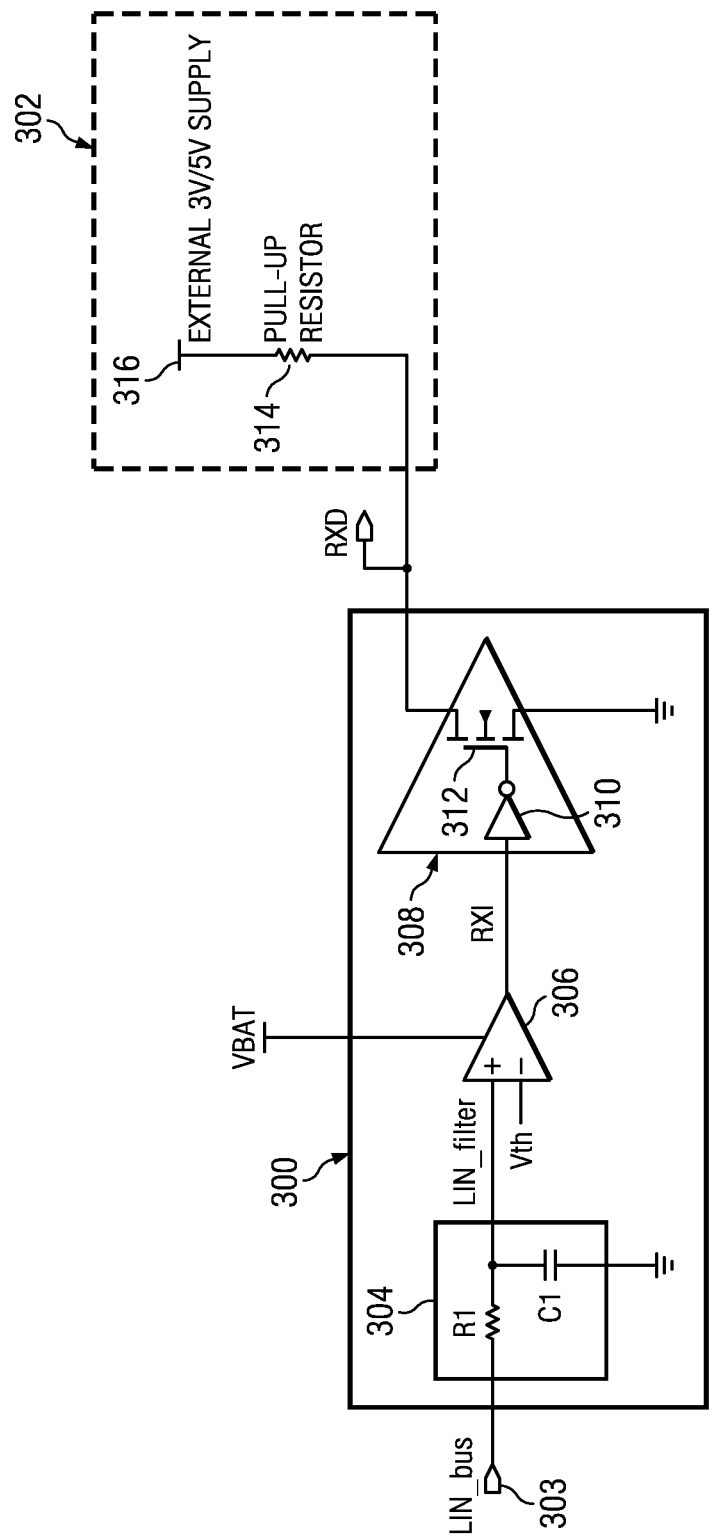
FIG. 3 illustrates a conventional LIN receiver circuit.

FIG. 3 illustrates a conventional LIN receiver circuit 300 coupled to pull-up circuitry 302 and a data bus LIN input pin 303, wherein the receiver circuit 300 is powered by a battery supply VBAT. The receiver 300 corresponds to the receiver circuitry 102 in FIG. 1A and includes a LIN input signal LIN_bus received from the data bus input pin 303, an RC filter 304 providing a filtered LIN signal LIN_filter, a hysteresis comparator 306 producing a logic output signal RXI, and a driver block 308 providing the receiver output signal RXD.

The RC filter 304 comprises a resistor R1 and capacitor C1. The RC filter 304 receives the LIN input signal LIN_bus from the input pin 303 and filters the signal to produce filtered input signal LIN_filter at an input of the hysteresis comparator 306.

The hysteresis comparator 306 receives the filtered input signal LIN_filter from the RC filter 304 at a first input, compares it to a threshold voltage Vth received at a second input, and produces the logic output signal RXI. The threshold voltage Vth shown in FIG. 3 is representative of either a high threshold voltage Vth(high) or a low threshold voltage Vth(low). It should be understood by those of ordinary skill in the art that a comparator circuit may be converted to a hysteresis circuit designed such that an input (e.g., Vth) may be one of two different values (e.g., Vth(high) or Vth(low)). The hysteresis comparator 306 provides a hysteresis function having an upper threshold voltage Vth(high) and a lower threshold voltage Vth(low). When the input signal LIN_bus goes to a dominant state, the filtered input signal LIN_filter falls to a voltage below or equal to Vth(low), and the comparator output signal RXI goes low. When the input signal LIN_bus goes to a recessive state, the filtered input signal LIN_filter rises to a voltage greater than or equal to Vth(high), and the comparator output signal RXI goes high. The foregoing is further explained below in connection with FIGS. 4A, 4B, and 4C.

The driver block 308 receives the logic output signal RXI from the hysteresis comparator 306, and produces the receiver output signal RXD. The driver block 308 acts as a driver stage for the receiver circuit 300, and comprises a NOT gate 310 and a transistor 312 providing an open-drain output of the receiver output signal RXD. The driver block 308 is coupled to the pull-up circuitry 302, wherein the pull-up circuitry 302 comprises a pull-up resistor 314 forcing the output signal RXD at the open-drain and an external voltage supply 316 acting as a level shift between inner logic supply voltage and external logic supply voltage. When the RXI signal is high, the gate of the transistor 312 is off, meaning the transistor 312 is off and RXD is equal to the external voltage supply 316. When RXI is low, the gate of the transistor 312 is on and the transistor 312 pulls the RXD signal to ground.

The RC filter 304 and hysteresis comparator 306 provide the receiver 300 illustrated in FIG. 3 with decent immunity to radio frequency (RF) pulse injections; however, the circuit 300 is vulnerable to ISO pulses (e.g., ISO1, ISO3b, etc.) as explained below. When ISO pulses are injected into the LIN input pin 303, the input signal LIN_bus is typically driven to a lower voltage value, generally below ground (see FIGS. 4B and 4C). If the ISO pulse occurs when the input signal LIN_bus is in the dominant state, the filtered input signal LIN_filter is at or below the Vth(low) threshold voltage, therefore the comparator output signal RXI is already low, and the ISO pulse generally does not affect the receiver output signal RXD. However, if the ISO pulse occurs when the input signal LIN_bus is in a recessive state (see FIG. 4B) or in transition between recessive and dominant states (i.e, the ISO pulse occurs as the LIN_bus signal falls from recessive state to dominant state, and the correct comparator output signal RXI is still high—see FIG. 4C), the ISO pulse causes the filtered input signal LIN_filter to prematurely drop below the lower threshold voltage Vth(low), thus causing the logic output signal RXI to incorrectly go low, resulting in a premature low receiver output signal RXD. The incorrect low states occurring (or periods of time in which the premature low states occur) on the receiver output signal RXD and logic output signal RXI are considered glitches.

FIGS. 4A, 4B, and 4C are provided to illustrate the above disclosure, wherein FIG. 4A illustrates operation of the receiver circuit 300 without any injected ISO pulses, FIG. 4B illustrates operation of the receiver circuit 300 with an injected ISO pulse occurring when the input signal LIN_bus is in a recessive state, and FIG. 4C illustrates operation of the receiver circuit 300 with an injected ISO pulse occurring when the input signal LIN_bus is in transition between recessive and dominant states. FIG. 4A shows an example LIN_bus waveform 402, example LIN_filter waveform 404, and example RXI/RXD waveform 406. In the embodiment illustrated in FIG. 3, the RXI and RXD signals have the same waveform and, therefore, are shown as a single RXI/RXD waveform in FIGS. 4A, 4B, and 4C. When the input signal LIN_bus waveform 402 changes, the filtered input signal LIN_filter waveform 404 also changes. As explained above, the hysteresis comparator 306 provides a hysteresis function wherein, the RXI/RXD waveform 406 goes high when the filtered input signal LIN_filter waveform 404 is greater than or equal to the upper threshold voltage Vth(high), and goes low when the filtered input signal LIN_filter waveform 404 is less than or equal to the lower threshold voltage Vth(low).

FIG. 4B illustrates an example input signal LIN_bus waveform 408 with an ISO pulse 410 occurring when the input signal LIN_bus is in a recessive state. The ISO pulse 410 is reflected in the LIN_filter signal waveform 412 by driving the LIN_filter signal below the low threshold voltage Vth(low) before it rises again above the high threshold voltage Vth (high). When ISO pulse 410 drives the LIN_filter signal waveform 412 below the low threshold voltage Vth(low), it results in an inaccurate low output 414 (i.e., a glitch) in the RXI/RXD waveform 416 for a period of time T. Since a glitch 410 is present on the RXD waveform 416, the receiver circuit 300 fails at least one of the function conditions. As such, the receiver circuit 300 shown in FIG. 3, fails to provide immunity against ISO pulses occurring when the input signal LIN_bus is in a recessive state.

FIG. 4C illustrates an example input signal LIN_bus waveform 418 with an ISO pulse 420 occurring when the input signal LIN_bus is transitioning from a recessive state to a dominant state. The ISO pulse 420 is reflected in the LIN_filter signal waveform 422 by driving the LIN_filter signal below the low threshold voltage Vth(low) prematurely at point 424. As shown in the corresponding RXI/RXD waveform 426, the premature crossing of the low threshold voltage Vth(low), causes the RXI/RXD signal to go low prematurely. Referring again to the LIN_filter waveform 422, after the ISO pulse 420 occurs, the LIN_filter waveform 422 rises again to reach its intended signal path (i.e., the signal path that would have otherwise occurred had the ISO pulse not been present on the input signal LIN_bus), wherein it crosses the low voltage threshold Vth(low) at point 428. Accordingly, the correct RXI/RXD signal would have gone low at point 428, rather than at point 424. As such, the RXI/RXD waveform 426 contains an incorrect (premature) low state 430 between points 424 and 426, for a period of time T'. Since a glitch 430 is present on the RXD waveform 426, the receiver circuit 300 again fails at least one of the function conditions. As such, the receiver circuit 300 shown in FIG. 3, fails to provide immunity against ISO pulses occurring when the input signal LIN_bus is transitioning from a recessive state to a dominant state.

Figure 5:
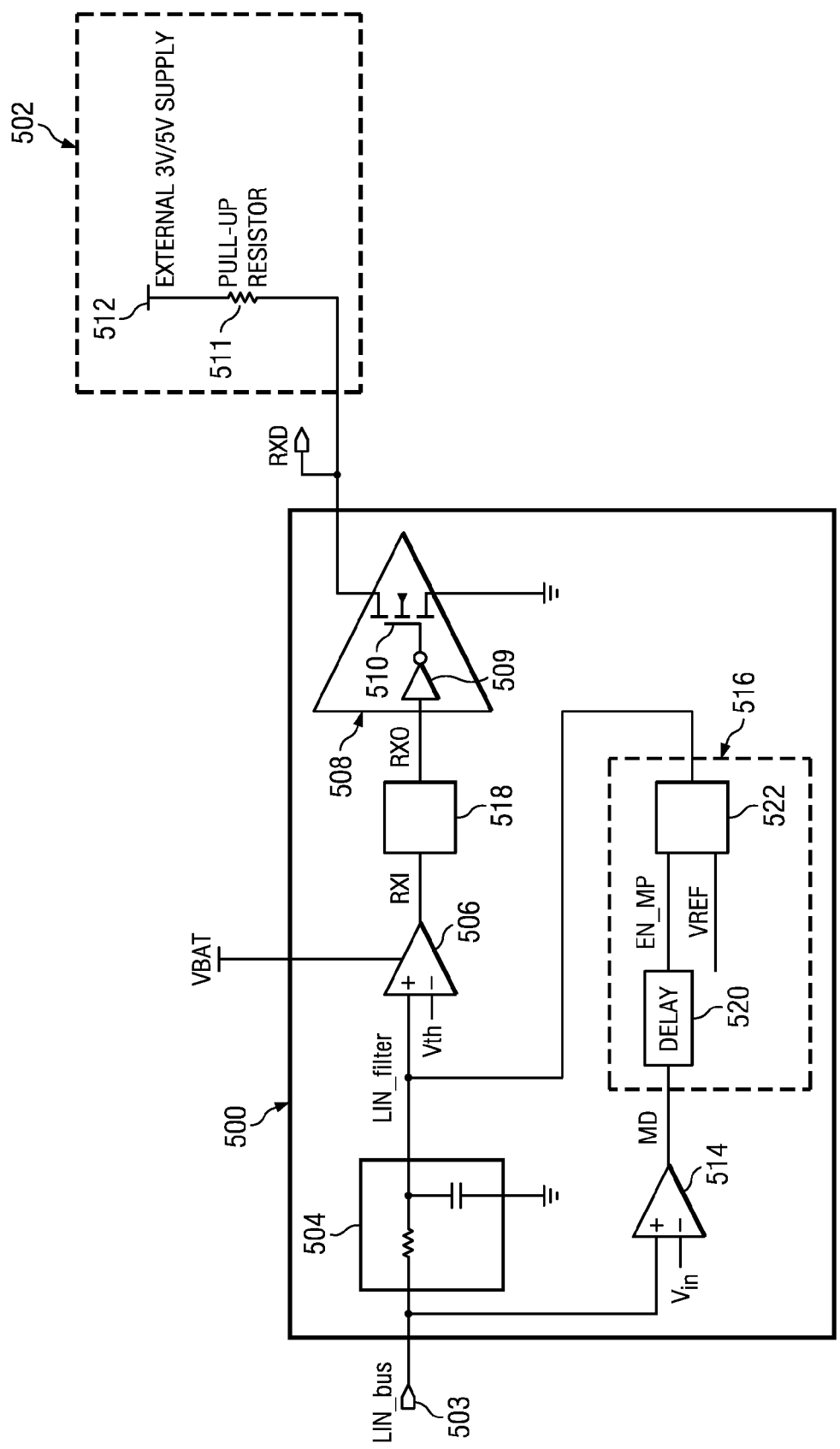
FIG. 5 illustrates an example embodiment of the disclosed LIN receiver circuit.

The present disclosure provides a LIN receiver circuit that provides immunity against ISO pulses. FIG. 5 illustrates an example embodiment of the disclosed LIN receiver circuit 500 in accordance with the present disclosure, wherein the receiver circuit 500 is coupled to pull-up circuitry 502 and a data bus LIN input pin 503 (also referred to herein as the LIN input pin or input pin). The disclosed receiver circuit 500 includes circuitry similar to that comprising the receiver 300 shown in FIG. 3 and described above. For example, the disclosed receiver circuit 500 is powered by a battery supply VBAT, receives a LIN input signal LIN_bus from the LIN bus 503, and includes an RC filter 504 receiving the LIN input signal LIN_bus and producing a filtered LIN signal LIN_filter, a hysteresis comparator 506 receiving the LIN_filter signal, comparing it to a threshold voltage Vth, and producing a logic output signal RXI, and a driver block 508 producing the receiver output signal RXD. The RC filter 504 operates similar to the RC filter 304 as described above.

The hysteresis comparator 506 operates similar to the comparator 306 as described above. As such, the hysteresis comparator 506 provides a hysteresis function having an upper threshold voltage Vth(high) and a lower threshold voltage Vth(low), wherein the upper threshold voltage Vth(high) and lower threshold voltage Vth(low) are represented in FIG. 5 as Vth. Although the upper and lower threshold voltages Vth (high) and Vth(low) may vary depending upon various design preferences, in the example embodiment illustrated in FIG. 5, the upper threshold voltage Vth(high) is equal to 0.55*VBAT, and the lower threshold voltage Vth(low) is equal to 0.45*VBAT. Accordingly, when the filtered LIN signal LIN_filter is equal to or greater than Vth(high), the logic output signal RXI goes high. Conversely, when the filtered LIN signal LIN_filter is less than or equal to Vth(low), the logic output signal RXI goes low. It should be understood that the values assigned herein to the threshold voltages Vth(high) and Vth(low) are examples, and the threshold voltages Vth (high) and Vth(low) are not limited to the example values disclosed herein.

The driver block 508 operates similar to the output block 308 as described above. As such, the driver block 508 acts as a driver stage for the receiver circuit 500, and comprises a NOT gate 509 and a transistor 510 providing the open-drain output of the receiver output signal RXD. The driver block 508 is coupled to the pull-up circuitry 502, wherein the pull-up circuitry 502 comprises a pull-up resistor 511 forcing the output signal RXD at the open-drain and an external voltage supply 512 acting as a level shift between inner logic supply voltage and external logic supply voltage. In the example embodiment illustrated in FIG. 5, the external voltage supply 512 may be approximately 3-5V thus acting as a level shifter between the voltage supply VBAT and external circuitry (not shown) receiving the receiver output signal RXD. It should be understood that the voltage at the external voltage supply 512 is an example value, and that this example voltage value is not intended to limit the scope of the present disclosure.

In addition to the aforementioned circuitry, the receiver circuit 500 illustrated in FIG. 5 further comprises an input comparator 514, signal-adjusting circuitry 516, and deglitching circuitry 518. In general, the input comparator 514 determines when the LIN pin 503 is driven to the low voltage value (presumably by ISO pulses). Responsive to this determination, the signal-adjusting circuitry 516 may drive the LIN_filter signal to a particular value greater than the voltage at LIN_bus, thereby shortening the length of time that an incorrect value (i.e., glitch) is output on the RXI signal. Meanwhile, the deglitching circuitry 518 detects the glitch on RXI and produces a deglitcher output signal RXO. The deglitcher output signal RXO is received by the driver block 508, which outputs the receiver output signal RXD. In order to satisfy the function conditions of the ISO immunity test, the receiver output signal RXD contains no glitches, and is time-shifted (i.e., delayed) by no more than 7.5 μs. As such, the disclosed LIN receiver circuit 500 provides immunity to both ISO pulses and RF pulses.

The input comparator 514 is operable to detect the presence of ISO pulses by determining when the voltage at the input pin 503 falls below a predetermined voltage Vin. The predetermined voltage Vin may be set to be a particular low voltage value (e.g., a negative value) such that when LIN_bus falls below the predetermined voltage value Vin, it is presumed that an ISO pulse has occurred. As shown in FIG. 5, the input comparator 514 receives the LIN input signal LIN_bus from the input pin 503, and compares the LIN input signal LIN_bus to the predetermined voltage value Vin. The input comparator 514 then produces a logic output signal MD indicating whether or not LIN_bus is greater than the predetermined voltage value Vin. For example, for Vin=−2.5V, the input comparator 514 compares LIN_bus to −2.5V. If LIN_bus>−2.5V, MD=0. If LIN_bus<−2.5V, MD=1. It should be appreciated that the predetermined voltage value Vin provided at the input comparator 514 may be selected according to various factors. For example, the predetermined voltage value Vin may be set to a particular value so as to satisfy the requirements of the battery/ground shift in the conformance test.

The signal-adjusting circuitry 516 is operable to drive the voltage of LIN_filter (at the first input to hysteresis comparator 506) to be a particular voltage when the input comparator 514 detects the presence of an ISO pulse. Generally, this forced voltage value (VREF, as explained below) is selected to be greater than the predetermined voltage value Vin connected at the input to the input comparator 514. For example, in accordance with the previous example, if Vin=−2.5V, then LIN_filter may be forced to 0.5*VBAT, wherein VBAT=14V. In essence, by forcing the voltage at LIN_filter to be a greater value, the amount of time required for the LIN_filter signal to recover, or rather, equal the high threshold voltage Vth(high) (thus producing the correct high state on RXI), is decreased. In this example, instead of recovering from −2.5V to Vth (high), the LIN_filter signal effectively recovers from 0.5*VBAT to Vth(high). Indeed, the adjustment of the LIN_filter signal eliminates the time it would have taken for the LIN_filter signal to recover from −2.5V to 0.5*VBAT. As such, the signal-adjusting circuitry 516 effectively shortens the length of time that an error occurs on the logic output signal RXI as a result of an ISO pulse. Specifically, the forced voltage value VREF is selected so that it effectively shortens the error on RXI such that the error may be detected and removed by the deglitching circuitry 518 as explained in greater detail below, so that the error does not appear on the deglitcher output signal RXO or receiver output signal RXD.

The signal-adjusting circuitry 516 is comprised of a delay circuit 520 receiving the input comparator output signal MD and providing an enable signal EN_MP to an adjustment circuit 522. In some embodiments, the adjustment circuit 522 may be accidentally triggered by RF pulses in the range of 1 MHz-1000 MHz if the rising edge of the enable signal EN_MP is not delayed for a period of time greater than 1.0 µs. Therefore, in the example embodiment illustrated in FIGS. 6A and 6B, the delay circuit 520 comprises a first signal delay circuit 610 for delaying a rising edge of the enable signal EN_MP by approximately 1.2 µs. Additionally, since the signal-adjusting circuitry 516 is sensitive to the filtered signal LIN_filter at the output of the RC filter 504, the falling edge of the enable signal EN_MP is delayed for a sufficient amount of time to allow for the filtered signal LIN_filter to stabilize. As such, the delay circuit 520 also includes a second signal delay circuit 620 for delaying the falling edge of the enable signal EN_MP by approximately 3.0 µs (this embodiment presumes that the LIN_filter signal stabilizes in less than 3.0 µs). The outputs of the first and second signal delay circuits 610 and 620 are input to an OR gate 630, which produces the enable signal EN_MP.

Figure 6A:
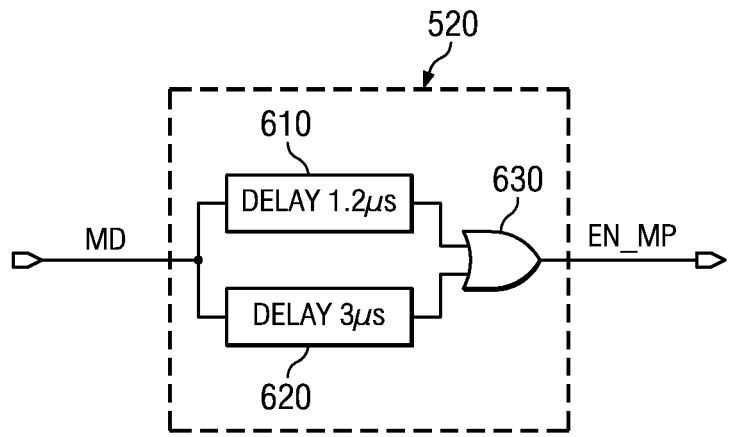
FIGS. 6A and 6B illustrate a detailed view of the delay circuit provided in FIG. 5 and waveforms corresponding to an input signal received at the delay circuit, respectively.
Figure 6B:
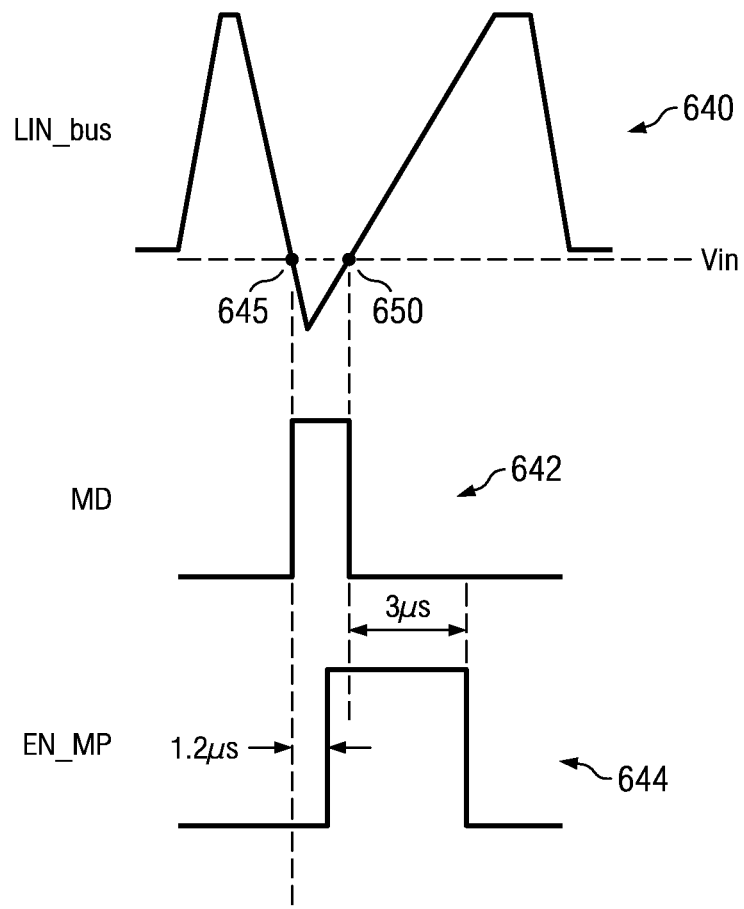

FIG. 6B illustrates waveforms for an example LIN_bus input signal 640, an example input comparator output signal MD 642, and an example enable signal EN_MP 644 in accordance with the delay circuit 520 illustrated in FIG. 6A. The waveforms in FIG. 6B are provided as example waveforms to illustrate the effects of the delay circuit 520 provided in FIG. 6A. When the LIN_bus input signal 640 is below the predetermined voltage value Vin provided at the input of the input comparator 514 (shown at point 645 in FIG. 6B), the input comparator output signal MD 642 goes high, and the first signal delay circuit 610 delays the rising edge of the enable signal EN_MP 644 by 1.2 µs. When the LIN_bus input signal 640 rises above the predetermined voltage value Vin (shown at point 650 in FIG. 6B), the input comparator output signal MD 642 goes low, and the second signal delay circuit 620 delays the falling edge of the enable signal EN_MP 644 by 3 µs. It should be appreciated by those of ordinary skill in the art that the delay times provided herein are example times provided to illustrate and describe the present disclosure and may vary according to several factors including, but not limited to, time width parameters of ISO pulses, the frequency of RF pulses, and signal delay time between components within the circuit.

Figure 7:
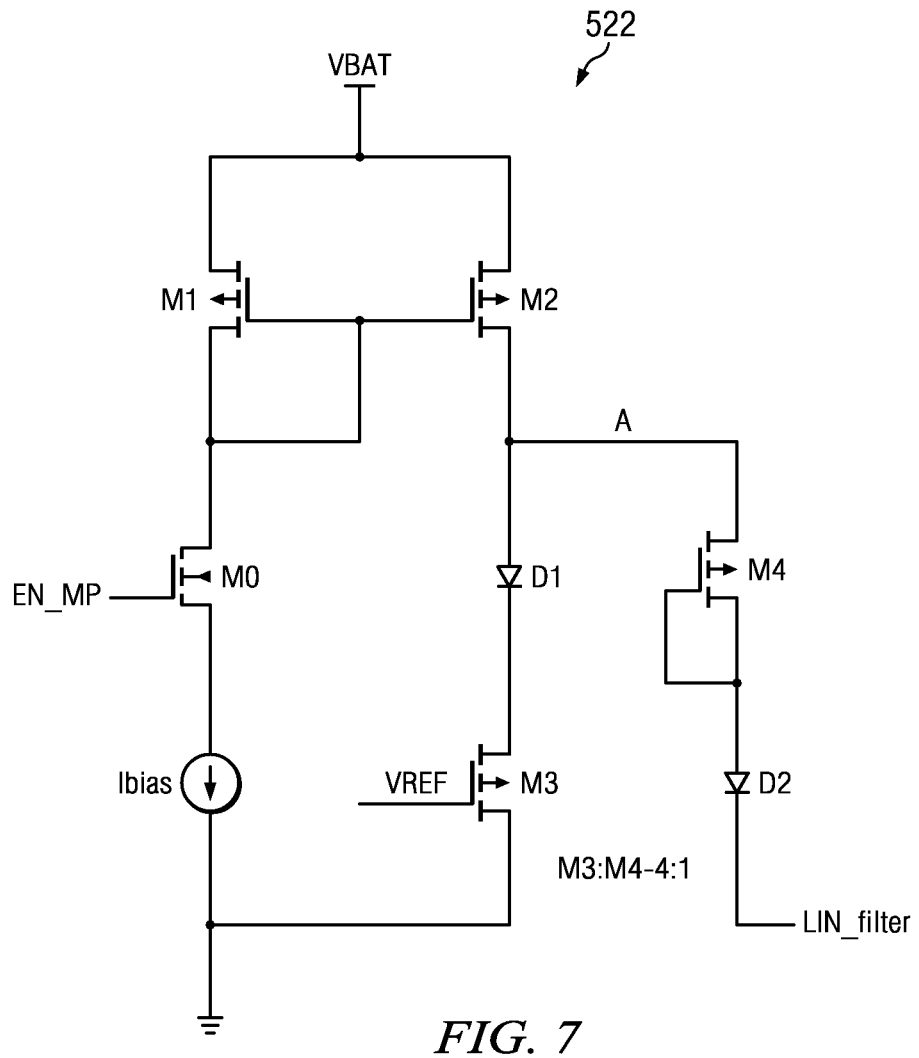
FIG. 7 illustrates a detailed view of the adjustment circuit provided in the receiver circuit shown in FIG. 5.

FIG. 7 provides a more detailed illustration of the adjustment circuit 522 shown in FIG. 5. The adjustment circuit 522 is operable to receive (a) the enable signal EN_MP from the delay circuit 520, and (b) a reference voltage VREF (briefly mentioned above), which may be applied to the filtered input signal LIN_filter. When the enable signal EN_MP is low, the adjustment circuit 522 is not active and, thus, does not produce any adjustment to the filtered input signal LIN_filter. Additionally, if the filtered input signal LIN_filter is greater than the reference voltage VREF at the time the enable signal EN_MP goes high, no adjustment is made to the filtered input signal LIN_filter. However, if the enable signal EN_MP goes high and the filtered input signal LIN_filter is less than the reference voltage VREF, then a current through transistor M4 and diode D2 causes the reference voltage VREF to be applied to the filtered input signal LIN_filter. Accordingly, the adjustment circuit 522 forces the filtered input signal LIN_filter to be adjusted or "pulled up" to the value of the reference voltage VREF. The effect of the adjustment circuit 522 is described in greater detail below in connection with the waveforms provided in FIGS. 8A and 8B.

Figure 8:
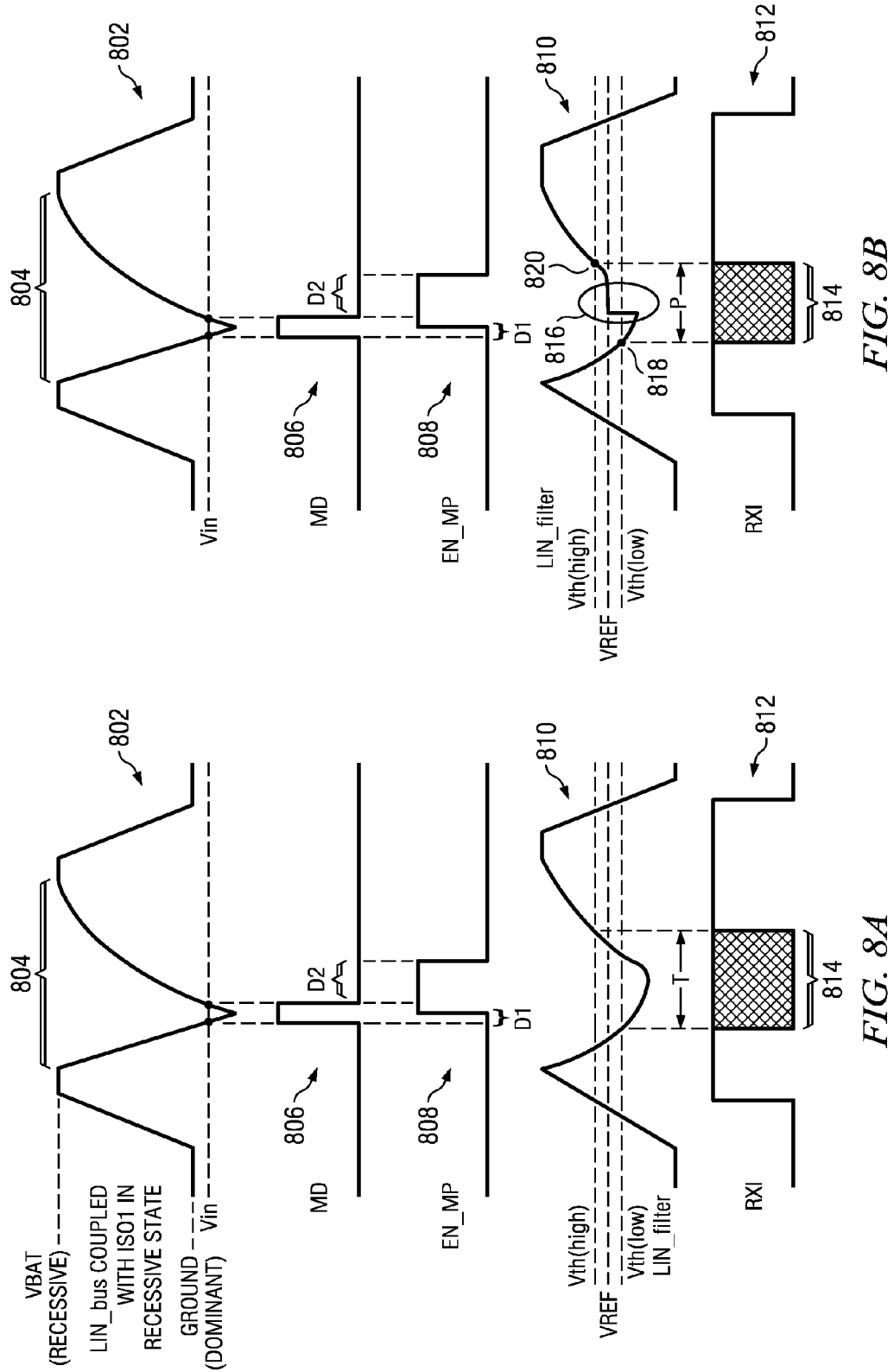
FIGS. 8A and 8B illustrate a comparison of the waveforms of various components of the disclosed LIN receiver circuit shown in FIG. 5 with and without an adjustment circuit.

FIGS. 8A and 8B are provided, in part, to illustrate the effects of the adjustment circuit 522 on the filtered input signal LIN_filter and the corresponding RXI signal when an ISO pulse occurs when the input signal LIN_bus is in the recessive state. FIG. 8A illustrates an example input signal LIN_bus waveform 802 having an ISO1 pulse 804 injected during a recessive state, the corresponding input comparator output signal MD waveform 806, the enable signal EN_MP waveform 808, the corresponding filtered input signal LIN_filter waveform 810, and the corresponding RXI signal waveform 812. The waveforms provided in FIG. 8A are designed to illustrate how the receiver circuit 500 would operate without the adjustment circuit 522. FIG. 8B illustrates the same waveforms as in FIG. 8A, but the waveforms in FIG. 8B correspond to the disclosed LIN receiver circuit 500 shown in FIG. 5 and, thus, illustrate the effects of the adjustment circuit 522.

In both FIGS. 8A and 8B, when the input signal LIN_bus waveform 802 falls below the predetermined voltage value Vin, the input comparator output signal MD goes high, essentially signaling the presence of an ISO pulse, and then goes low again once the input signal LIN_bus waveform 802 exceeds Vin. In accordance with the foregoing discussion, when the MD waveform 806 goes high, the enable signal EN_MP waveform 808 goes high after a first delay D1. When MD goes low, the enable signal EN_MP waveform 808 goes low after a second delay D2.

As previously stated, the waveforms shown in FIG. 8A correspond to an example embodiment of the LIN receiver without the adjustment circuit 522. Therefore, the filtered input signal LIN_filter waveform 810 (shown in FIG. 8A) is not adjusted and the RXI signal waveform 812 produces a glitch 814 occurring for a period of time T, wherein, for example, T≈3.8 µs. Since the waveforms shown in FIG. 8B correspond to the disclosed LIN receiver circuit 500 having the adjustment circuit 522, when the enable signal EN_MP waveform 808 goes high, the filtered input signal LIN_filter waveform 810 (shown in FIG. 8B) is adjusted. When the enable signal EN_MP waveform 808 goes high, the filtered input signal LIN_filter waveform 810 is less than the reference voltage value VREF. Therefore, the adjustment circuit 522 drives the filtered input signal LIN_filter to the reference voltage value VREF as shown at reference numeral 816. By adjusting the filtered input signal LIN_filter, the time occurring from the point at which the filtered input signal LIN_filter falls below Vth(low), and RXI subsequently goes low (see reference numeral 818), and the point at which the filtered input signal LIN_filter rises above Vth(high), and RXI subsequently goes high (see reference numeral 820), is also adjusted. When the reference voltage value VREF is greater than the voltage at LIN_filter when the enable signal EN_MP goes high, then the length of time occurring between point 818 and point 820 is shortened. Accordingly, the length of the glitch 814 occurring on the RXI waveform 812 is also shortened to a period of time P, wherein P<T≈3.8 µs. As shown in FIG. 8B, the adjustment circuit 522 effectively shortens the length of the glitch 814 occurring on the RXI signal 812.

As discussed above, the hysteresis comparator 506 in the disclosed LIN receiver circuit 500 operates similar to the hysteresis comparator 306 provided in FIG. 3. The hysteresis comparator 506 receives the filtered input signal LIN_filter, compares it to the threshold voltage Vth, and produces the logic output signal RXI. The logic output signal RXI is then received by the deglitching circuitry 518, wherein the deglitching circuitry 518 is operable to detect a glitch produced on the RXI signal by an ISO pulse and produce a deglitcher output signal RXO. In general, when the deglitching circuitry 518 detects a glitch on the RXI signal, the deglitching circuitry 518 removes the glitch from the RXI signal by delaying the falling edge of the RXI signal by a sufficient amount of time to effectively remove the incorrect low output (i.e., glitch) on RXI. A detailed description of the deglitching circuitry 518 is provided below in connection with FIGS. 9, 10A, 10B, and 10C.

Figure 9:
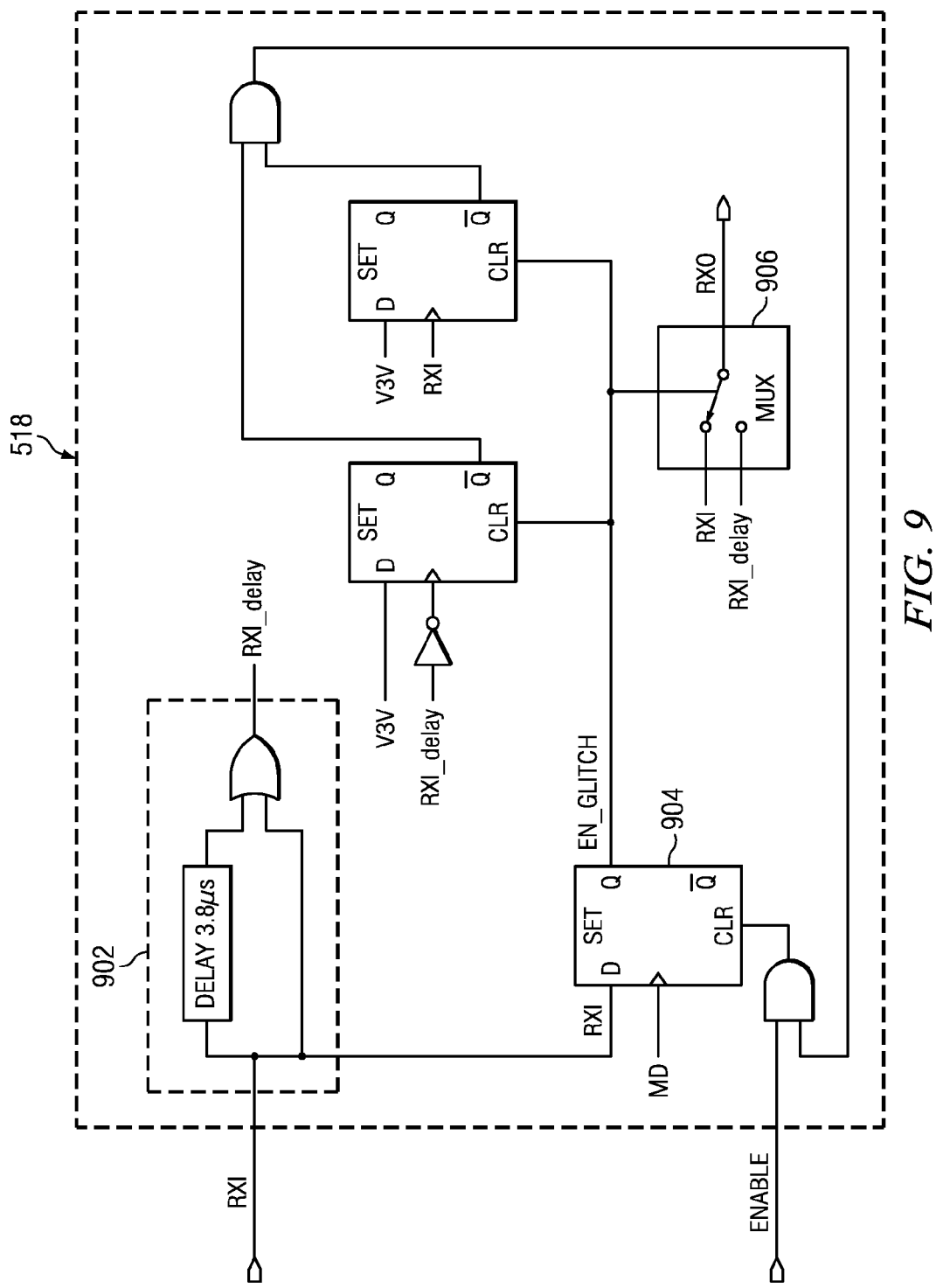
FIG. 9 illustrates a detailed view of the deglitching circuitry provided in the receiver circuit shown in FIG. 5.

FIG. 9 provides a detailed illustration of the deglitching circuitry 518 provided in the receiver circuit 500 shown in FIG. 5. The deglitching circuitry 518 receives input signals ENABLE, RXI, and MD, wherein ENABLE is the enable signal for the deglitching circuitry 518, RXI is the hysteresis comparator 506 output signal, and MD is the input comparator 514 output signal. The deglitching circuitry 518 outputs a deglitcher output signal RXO, wherein the deglitcher output signal RXO may be either the original RXI signal (if no glitch is present on RXI) or a delayed RXI signal RXI_delay (if a glitch is detected on RXI).

Figure 10B:
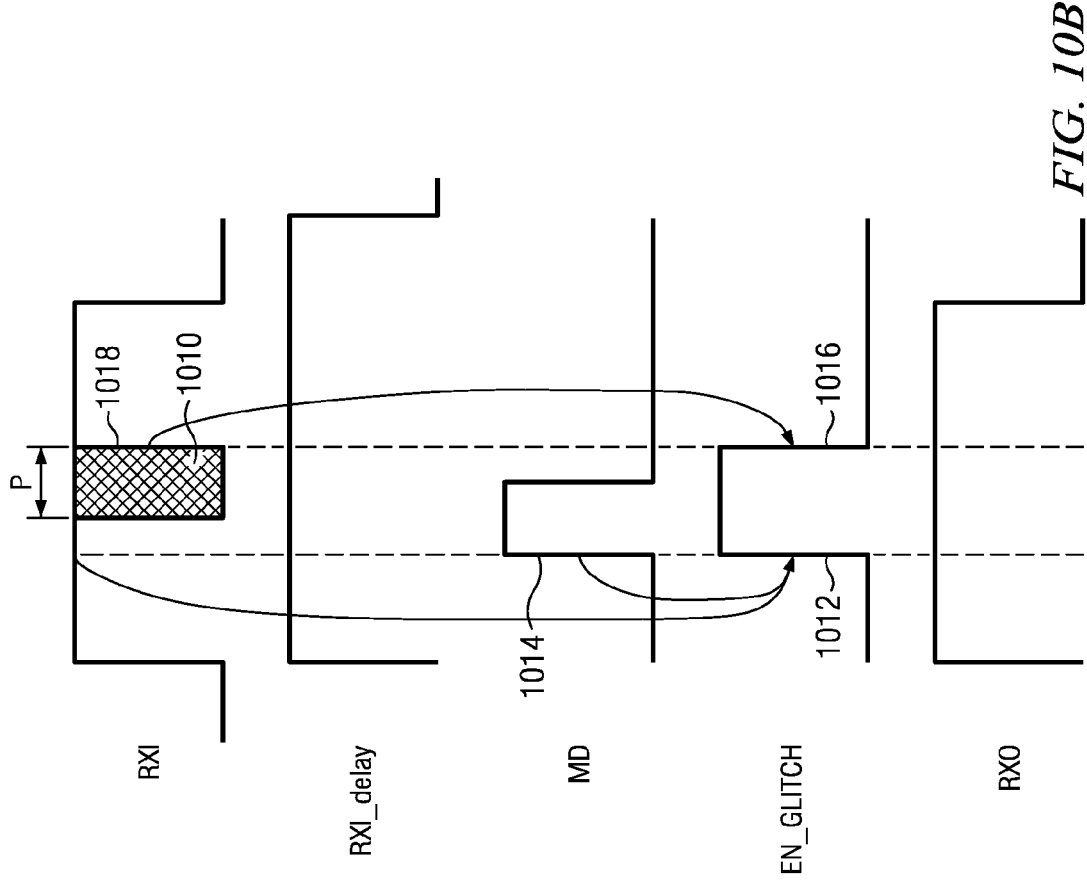
Figure 10A:
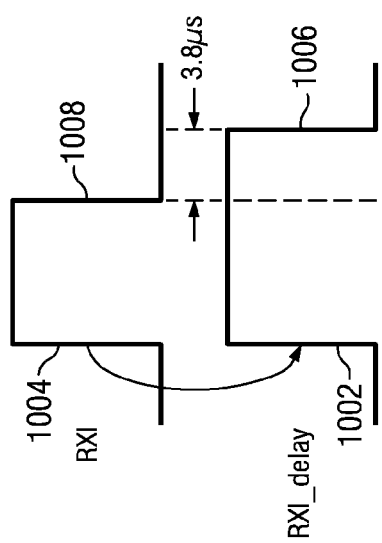

The RXI signal is received at delay circuitry 902, wherein the delay circuitry 902 delays a falling edge of the RXI signal by 3.8 μs to produce the RXI_delay signal, as illustrated in FIG. 10A. The delay time provided by the delay circuitry 902 is designed to be a sufficient amount of time such that the RXI_delay signal has a falling edge that is delayed by enough time to compensate for an incorrect low output occurring on the RXI signal as a result of an ISO pulse (this is further discussed below in connection with FIG. 10B). In accordance with the embodiments described above and illustrated in connection with FIG. 8B, the signal-adjusting circuitry 516 shortens the length of a glitch occurring on RXI to a period of time P, wherein P<T≈3.8 μs; therefore, in this embodiment, the delay time of the delay circuitry 902 is set to 3.8 μs. Since the receiver output signal RXD is equal to the deglitcher output signal RXO, and the deglitcher output signal RXO may be equal to the RXI_delay signal, it should be appreciated that the delay time provided by the delay circuitry 902 may, in some cases, cause a direct delay of the RXD signal. Therefore, in order to satisfy the output signal RXD delay time condition of the function criterion for determining ISO pulse immunity, the delay time provided by the delay circuitry 902 should be no greater than 7.5 μs. It should be appreciated that the 3.8 μs delay provided by the delay circuitry 902 is provided as an example amount of time sufficient to compensate for glitches occurring on the RXI signal. Accordingly, in some embodiments, the delay circuitry 902 may provide other delay times less than approximately 7.5 μs (provided that the delay time remains sufficient for glitch compensation).

The RXI signal is also received at the input pin of a flip-flop 904, wherein operation of the flip-flop 904 and, consequentially, the deglitching circuitry 518 is enabled by the ENABLE signal. The flip-flop 904 receives the input comparator output signal MD at its clock pin, and produces a signal EN_GLITCH. The EN_GLITCH signal is received at a MUX 906, and is used to select the appropriate deglitcher output signal RXO. By default, RXO=RXI. Therefore, if EN_GLITCH=0, then the MUX 906 selects RXO=RXI, and if EN_GLITCH=1, then the MUX 906 selects RXO=RXI_delay. In general, when the deglitching circuitry 518 is enabled, the EN_GLITCH signal goes high when a) RXI is high, and b) the input comparator output signal MD goes high. Additionally, EN_GLITCH goes low when a) a subsequent rising edge of the RXI signal occurs (e.g., at the end of a glitch), or b) a subsequent falling edge of the RXI_delay signal occurs. It should be appreciated that when RXI is low, the input signal LIN_bus is in a dominant state or transitioning from a dominant to recessive state. When this happens, an ISO pulse causes the LIN_bus signal to drop, but will not result in a glitch on RXI since RXI is already low. Therefore, the disclosed circuit 500 is not concerned with such a situation. Operation of the deglitching circuitry 518 shown in FIG. 9 is further described below in accordance with example circuit conditions illustrated in FIGS. 10A, 10B, and 10C.

FIG. 10A illustrates an example RXI signal and the corresponding RXI_delay signal produced by the delay circuitry 902 illustrated in FIG. 9. As shown in FIG. 10A, the RXI_delay signal has a rising edge 1002 occurring at substantially the same time as the rising edge 1004 of the RXI signal, and has a falling edge 1006 occurring 3.8 μs after the falling edge 1008 of the RXI signal. As previously explained, the delayed falling edge 1006 of the RXI_delay signal is designed to exceed the length of time P of any glitches occurring on the RXI signal. Although it is not explicitly indicated in FIGS. 10B and 10C, it should be understood that the falling edges of the RXI_delay signals are delayed by 3.8 μs with respect to the falling edges of their respective RXI signals.

FIG. 10B illustrates an example RXI signal, the corresponding RXI_delay signal, an example input comparator output signal MD, the corresponding EN_GLITCH signal, and the deglitcher output signal RXO for an example in which an ISO pulse occurs during the recessive state of the input signal (similar to the condition illustrated in FIG. 8B). As shown in FIG. 10B, the RXI signal has a glitch 1010 (i.e., incorrect low state) occurring for a period of time P, wherein P<3.8 μs. In the example illustrated in FIG. 10B, the EN_GLITCH signal has a rising edge 1012 occurring at substantially the same time as a rising edge 1014 of the MD signal, and a falling edge 1016 occurring at substantially the same time as a rising edge 1018 of the RXI signal (at the end of the glitch 1010). When EN_GLITCH is low, RXO=RXI, and when EN_GLITCH is high, RXO=RXI_delay. As shown in FIG. 10B, since falling edges of the RXI_delay signal are delayed by 3.8 μs, and the length P of the glitch 1010 is shorter than 3.8 μs, then the glitch 1010 does not show up in the RXI_delay signal. Therefore, during the time in which the glitch 1010 is present on RXI, the EN_GLITCH signal is high, and RXO=RXI_delay. As such, the deglitcher output signal RXO essentially provides a filtered, or deglitched, version of the RXI signal. Therefore, as shown in FIG. 10B, the disclosed receiver circuit 500 provides immunity to ISO pulses occurring during the recessive state of the input signal LIN_bus.

FIG. 10C illustrates an example in which an ISO pulse occurs during a period of time in which the input signal LIN_bus is transitioning from recessive state to dominant state. In this example, FIG. 10C illustrates an example LIN_bus signal waveform 1020, the corresponding MD signal waveform 1022, the adjustment circuit enable signal EN_MP waveform 1024, the LIN_filter waveform 1026, the RXI signal waveform 1028, the corresponding RXI_delay signal waveform 1030, the EN_GLITCH signal waveform 1032, and the deglitcher output signal RXO waveform 1034. The LIN_bus signal has an example ISO pulse 1036, causing the MD signal to go high and, after a first delay, the EN_MP signal to go high. The pulse 1036 is reflected on the LIN_filter signal waveform 1026 by causing the LIN_filter signal to fall prematurely, which results in a premature falling edge 1038 on the RXI signal waveform 1028. In accordance with FIG. 9, when the MD signal goes high, the EN_GLITCH signal also goes high since RXI is also high at that time. The EN_GLITCH signal waveform 1032 remains high until either a) the RXI signal goes high, or b) the RXI_delay signal goes low; therefore, when the RXI_delay signal waveform 1030 goes low at falling edge 1040, the EN_GLITCH signal waveform 1032 goes low at falling edge 1042. As shown in FIG. 10C, the RXO waveform 1034 is equal to RXI when the EN_GLITCH signal waveform 1032 is low, and is equal to RXI_delay when the EN_GLITCH signal waveform 1032 is high.

In the embodiment illustrated in FIG. 10C, the adjustment circuit 522 forces the LIN_filter signal waveform 1026 to VREF at point 1044. However, since VREF is less than Vth (high), the RXI signal waveform 1028 remains low. Therefore, the RXI signal waveform 1028 contains a premature low state occurring at its falling edge 1038, wherein this premature low state is an incorrect low state having a starting point at the falling edge 1038, and having an end point that is difficult to detect without having the rising edge caused by the adjustment circuit 522. However, since the start of the premature low state is generally known, the EN_GLITCH signal waveform 1032 goes high when the MD signal goes high, and the RXO signal is equal to RXI_delay until the falling edge 1040 of the RXI_delay signal waveform 1030 occurs. In this example, the delay in the correct output signal RXO is equal to 3.8 μs–T', wherein T' is the length of the premature low state. In other words, T' is equal to the amount of time between the point at which the filtered LIN_filter signal is driven below Vth(low) by the ISO pulse 1036, and the point at which the filtered LIN_filter signal would have otherwise fallen below Vth(low) had the ISO pulse 1036 not occurred. In a situation in which the ISO pulse 1036 does not cause a glitch (i.e., T'=0), the longest period of time that the correct RXO signal could be delayed would be 3.8 μs. Such a situation may include, for example, a situation in which the ISO pulse 1036 causes the LIN_filter signal to reach Vth(low) at the same time it would have otherwise reached Vth(low) had the ISO pulse not been present. Since this worst-case scenario results in a delay of 3.8 μs, and 3.8 μs is less than the 7.5 μs delay limitation, then the disclosed receiver circuit 500 also provides immunity to ISO pulses occurring when the input signal LIN_bus is transitioning from a recessive state to a dominant state.

Referring again to FIG. 5, once the deglitcher output signal RXO is received from the deglitching circuitry 518, the driver block 508 outputs the receiver output signal RXD. When RXO=1, the gate of the transistor 510 is off, meaning the transistor 510 is off and RXD is equal to the external voltage supply 512. When RXO=0, the gate of the transistor 510 is on and the transistor 510 pulls the RXD to ground. In accordance with the foregoing, the receiver output signal RXD satisfies both the damage and the function criteria for determining immunity to ISO pulses. As previously stated, the receiver circuit 500 is understood to satisfy the damage assessment. Since the receiver output signal RXD contains no incorrect low states and is not delayed by more than 7.5 μs, the function assessment is also satisfied. As such, the disclosed receiver circuit 500 provides sufficient immunity to ISO pulses.

Figure 11:
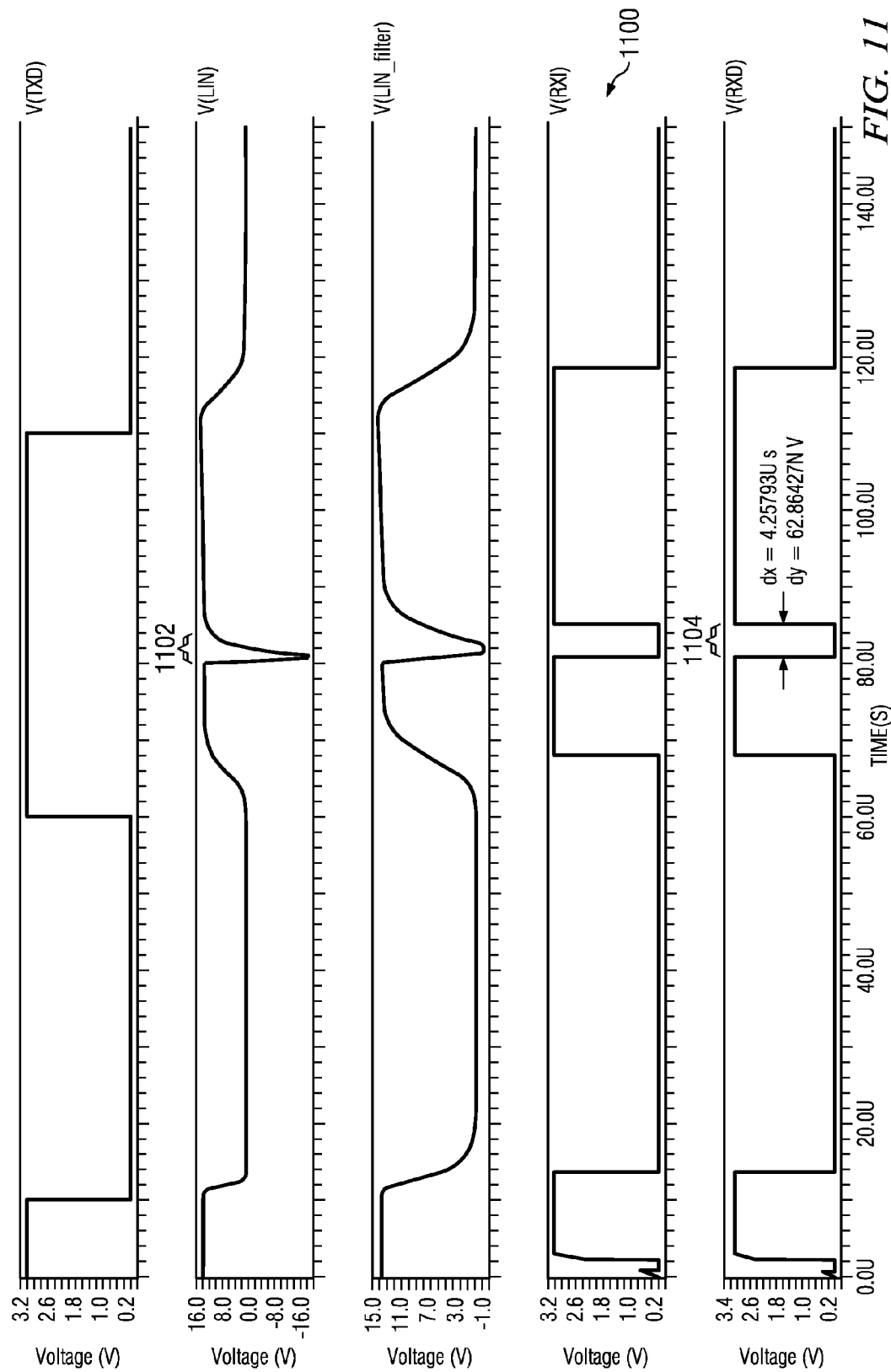
FIG. 11 shows simulation results of the LIN receiver circuit provided in FIG. 3 with an ISO1 pulse occurring on the input signal when the input signal is in a recessive state.

FIGS. 11-14 provide simulation results illustrating operation of the receiver circuit 300 provided in FIG. 3, and the disclosed receiver circuit 500 provided in FIG. 5. FIG. 11 shows simulation results 1100 of the circuit 300 in FIG. 3 with an ISO1 pulse 1102 occurring on the input signal LIN_bus when the input signal LIN_bus is in a recessive state. In this simulation (and that illustrated in FIG. 12), the amplitude of the ISO1 pulse is set to –100V, which is the worst-case scenario for an ISO1 pulse. In accordance with the foregoing disclosure, the simulation results 1100 indicate that the receiver circuit 300 in FIG. 3 produces an incorrect low output 1104 on the RXD signal and, thus, is not immune to ISO1 pulses occurring during a recessive state of the input signal LIN_bus.

Figure 12:
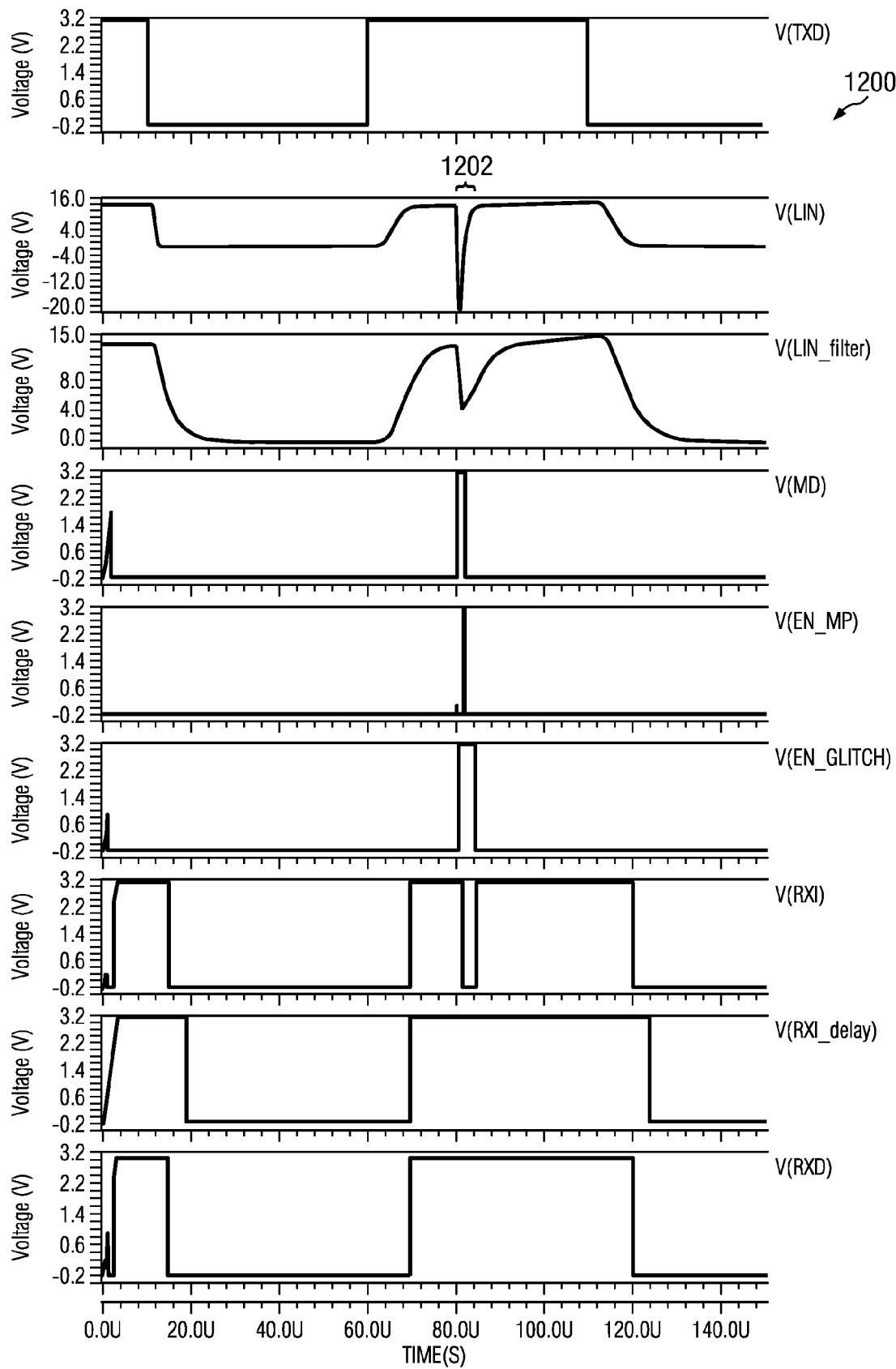
FIG. 12 shows simulation results of the LIN receiver circuit provided in FIG. 5 with an ISO1 pulse occurring on the input signal when the input signal is in a recessive state.

FIG. 12 shows simulation results 1200 of the disclosed receiver circuit 500 provided in FIG. 5 with an ISO1 pulse 1202 occurring on the input signal LIN_bus when the input signal LIN_bus is in a recessive state. The conditions of this simulation are similar to those provided in FIG. 11 so that the output signals RXD in each of the simulations may be compared. The simulation results 1200 provided in FIG. 12 indicate that the receiver circuit 500 in FIG. 5 produces no incorrect low states on the RXD signal and does not delay the RXD signal by more than 7.5 μs. Therefore, the receiver circuit 500 is immune to ISO1 pulses occurring during a recessive state of the input signal LIN_bus.

Figure 13:
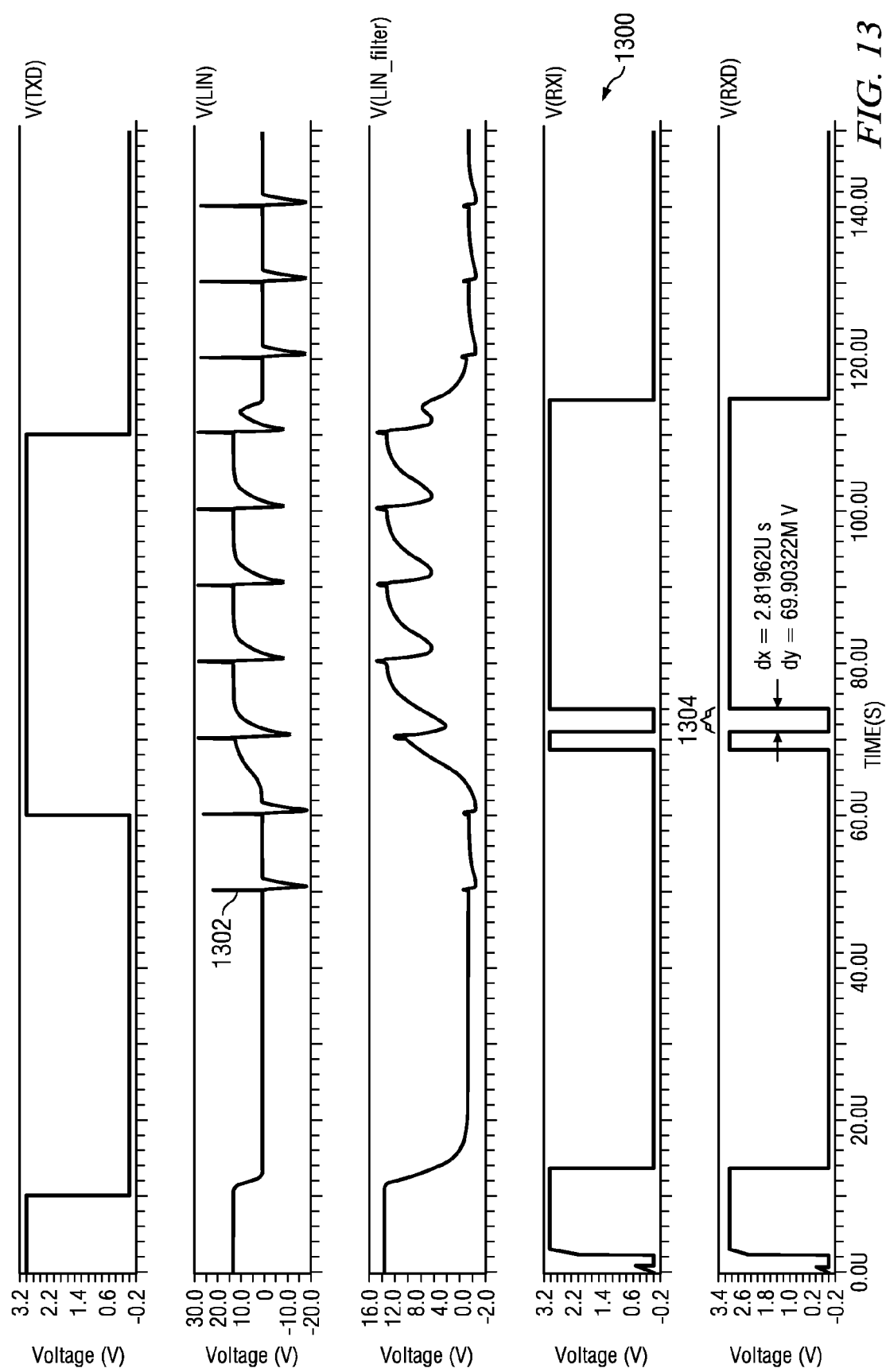
FIG. 13 shows simulation results of the LIN receiver circuit provided in FIG. 3 with ISO3b pulses occurring on the input signal when the input signal is in a dominant state, recessive state, and transitioning between recessive and dominant states.

FIG. 13 shows simulation results 1300 of the LIN receiver circuit 300 provided in FIG. 3 with ISO3b pulses 1302 occurring on the input signal LIN_bus when the input signal LIN_bus is in a dominant state, a recessive state, and transitioning between recessive and dominant states. In this simulation (and that illustrated in FIG. 14), the amplitude of the ISO3b pulses is set to +100V, which is the worst-case scenario for ISO3b pulses. As shown in the simulation results 1300, the occurrence of ISO3b pulses 1302 results in an incorrect low state 1304 on the output signal RXD. As such, the receiver circuit 300 provided in FIG. 3 fails to provide immunity to ISO3b pulses 1302 occurring on the input signal LIN_bus.

Figure 14:
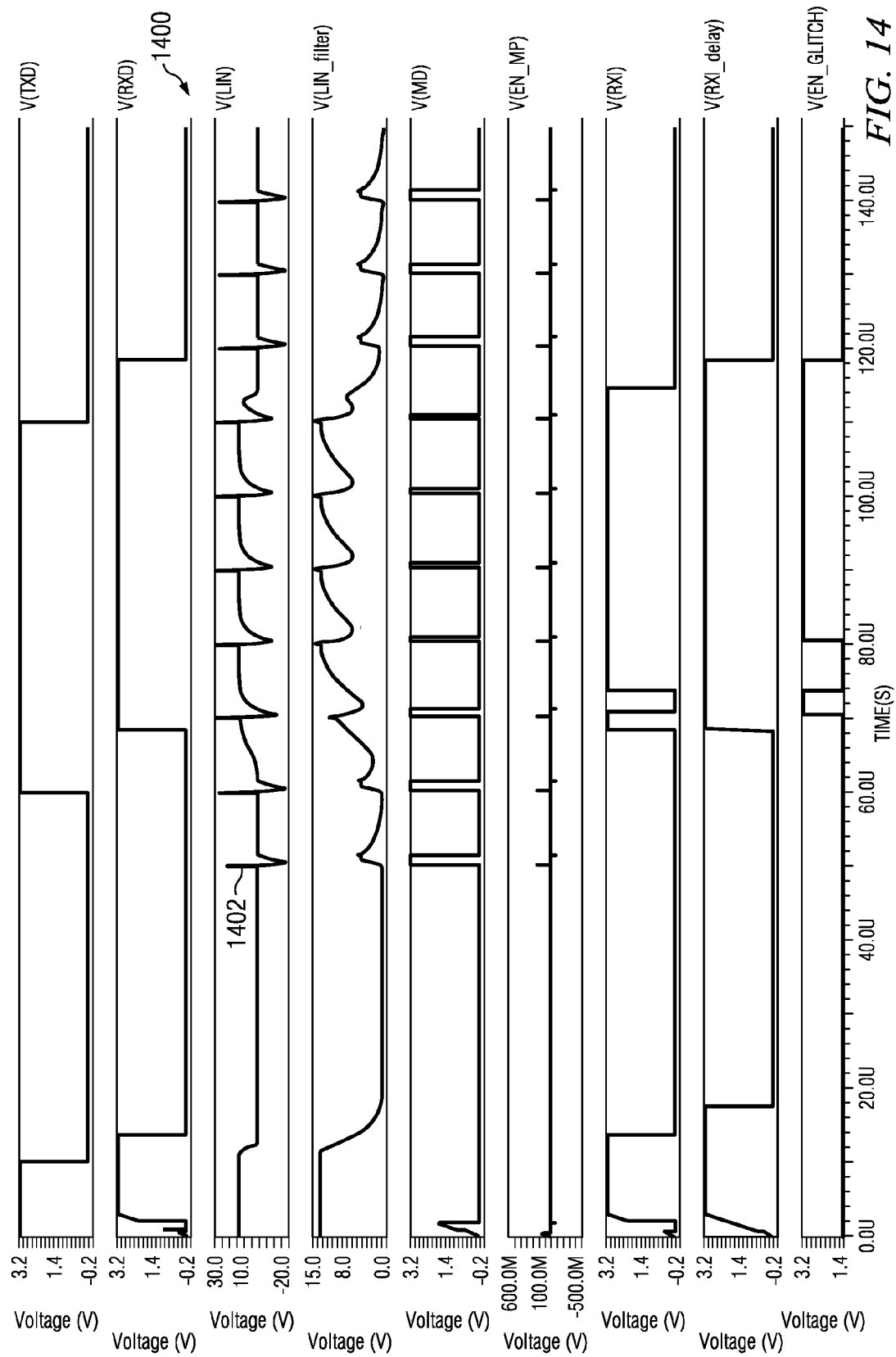
FIG. 14 shows simulation results of the LIN receiver circuit provided in FIG. 5 with ISO3b pulses occurring on the input signal when the input signal is in a dominant state, recessive state, and transitioning between recessive and dominant states.

FIG. 14 shows simulation results 1400 of the LIN receiver circuit 500 provided in FIG. 5 with ISO3b pulses 1402 occurring on the input signal LIN_bus when the input signal LIN_bus is in a dominant state, a recessive state, and transitioning between recessive and dominant states. The conditions of this simulation are similar to those provided in FIG. 13 so that the output signals RXD in each of the simulations may be compared. The simulation results 1400 provided in FIG. 14 indicate that the receiver circuit 500 in FIG. 5 produces no incorrect low states on the RXD signal and does not delay the RXD signal by more than 7.5 μs. Therefore, the receiver circuit 500 is immune to ISO3b pulses occurring on the input signal LIN_bus.

It should be appreciated that the receiver circuit disclosed herein contains several aspects that may be changed or altered without departing from the spirit and scope of the present disclosure as set forth in the claims provided below.

What is claimed is:

1. A circuit comprising:
   comparator circuitry operable to compare a filtered input signal to a first or second hysteresis threshold value and output a hysteresis signal having a first state if said filtered signal is less than or equal to said first hysteresis threshold value and having a second state if said filtered signal is greater than or equal to said second hysteresis threshold value;
   circuitry operable to detect a low transient voltage of an unfiltered input signal, wherein said low transient voltage would produce an effective glitch lasting for a first length of time on said hysteresis signal;
   voltage-adjusting circuitry operable, in response to the detection of said low transient voltage, to adjust a voltage of said filtered signal to shorten said effective glitch to a second length of time less than said first length of time; and deglitcher circuitry operable to detect and remove said shortened effective glitch from said hysteresis signal and generate an output signal.

2. The circuit as set forth in claim 1, wherein said deglitcher circuitry comprises delay circuitry operable to receive said hysteresis signal and output a delayed signal having a first falling edge delayed after a falling edge of said hysteresis signal, wherein said first falling edge is delayed by a third length of time less than said first length of time.

3. The circuit as set forth in claim 2, wherein said third length of time is greater than or equal to said second length of time.

4. The circuit as set forth in claim 2, wherein said deglitcher circuitry further comprises output circuitry operable to output said hysteresis signal as the output signal when said shortened effective glitch is not detected and output said delayed signal as the output signal when said shortened effective glitch is detected.

5. The circuit as set forth in claim 1, wherein said circuit further comprises a filter operable to receive said unfiltered input signal and produce said filtered input signal.

6. The circuit as set forth in claim 1, wherein said circuitry operable to detect a low transient voltage comprises a comparator operable to receive said unfiltered input signal and compare said unfiltered input signal to a first reference voltage.

7. The circuit as set forth in claim 1, wherein said voltage-adjusting circuitry comprises an adjustment circuit operable to receive a second reference voltage and an enable signal indicating the detection of said low transient voltage, wherein said adjustment circuit drives said filtered input signal towards said second reference voltage when said low transient voltage is detected and said filtered input signal is less than said second reference voltage.

8. The circuit as set forth in claim 1, wherein said low transient voltage is indicative of an interrupt source output pulse affecting said unfiltered input signal.

9. The circuit as set forth in claim 1, wherein said effective glitch is an incorrect second state on said hysteresis signal.

10. The circuit as set forth in claim 1, wherein said circuit is a receiver circuit in a Local Interconnect Network.

11. A receiver circuit comprising:
a comparator circuit configured to receive an input signal and a first reference voltage and output a comparator signal indicating the presence of a low transient voltage on said input signal;
voltage-adjusting circuitry configured to receive said comparator signal and a second reference voltage and output an adjustment current when said comparator signal indicates the presence of said low transient voltage on said input signal, said adjustment current driving a filtered input signal toward said second reference voltage when said filtered input signal is less than said second reference voltage;
a hysteresis circuit configured to compare said filtered input signal to first or second hysteresis threshold values and produce a hysteresis signal having a first state if said filtered input signal is less than or equal to said first hysteresis threshold value and having a second state if said filtered input signal is greater than or equal to said second hysteresis threshold value, wherein said hysteresis signal would have an effective glitch as a result of said low transient voltage, and wherein a length of said effective glitch on said hysteresis signal is shortened by said adjustment current driving said filtered input signal to said second reference voltage when said filtered input signal is less than said second reference voltage; and
a deglitcher circuit configured to receive said hysteresis signal and said comparator signal and produce an output signal by removing said shortened effective glitch.

12. The receiver circuit as set forth in claim 11, wherein said low transient voltage is indicative of an interrupt source output pulse affecting said input signal.

13. The receiver circuit as set forth in claim 11, wherein said effective glitch on said hysteresis signal is an incorrect second state.

14. The receiver circuit as set forth in claim 11, further comprising a driver stage configured to receive said output signal from said deglitcher circuit and output a receiver circuit output signal.

15. The receiver circuit as set forth in claim 11, further comprising a filter circuit configured to receive said input signal and produce said filtered input signal.

16. The receiver circuit as set forth in claim 11, wherein said receiver circuit comprises a receiver in a Local Interconnect Network.

17. The receiver circuit as set forth in claim 11, wherein said output signal is equal to said hysteresis signal when said comparator signal does not indicate the presence of said low transient voltage on said input signal, and is equal to said hysteresis signal having a delayed falling edge when said comparator signal indicates the presence of said low transient voltage on said input signal and said hysteresis signal is said first state.

18. The receiver circuit as set forth in claim 17, wherein said delayed falling edge is delayed by an amount of time greater than or equal to the shortened effective glitch.

19. The receiver circuit as set forth in claim 17, wherein said delayed falling edge is delayed by an amount of time less than said effective glitch.

20. A method, comprising:
filtering an input signal to produce a filtered signal;
comparing said filtered signal to a first or second hysteresis value;
outputting a hysteresis signal having a first state if said filtered signal is less than or equal to said first hysteresis value and having a second state if said filtered signal is greater than or equal to said second hysteresis value;
detecting a low transient voltage on said input signal, wherein said low transient voltage would produce an effective glitch lasting for a first length of time on said hysteresis signal;
in response to the detection of said low transient voltage, adjusting a voltage of said filtered signal to shorten said effective glitch to a second length of time less than said first length of time;
detecting said shortened effective glitch on said hysteresis signal; and
removing said shortened effective glitch from said hysteresis signal to produce an output signal.

21. The method as set forth in claim 20, wherein adjusting a voltage of said filtered signal further comprises adjusting said filtered signal voltage towards said reference voltage if said filtered signal is less than said reference voltage.

22. The method as set forth in claim 20, wherein removing said shortened effective glitch on said hysteresis signal comprises:
outputting a corrected signal having a first falling edge delayed after a falling edge of said hysteresis signal by a third length of time less than said first length of time.

23. The method as set forth in claim 22, wherein said third length of time is greater than or equal to said second length of time.

24. The method as set forth in claim 20, wherein said low transient voltage is indicative of an interrupt source output pulse affecting said input signal.

25. The method as set forth in claim 20, wherein said effective glitch is an incorrect second state of said hysteresis signal.

26. The method as set forth in claim 20, wherein said receiver circuit comprises a receiver in a Local Interconnect Network.

* * * * *